US 8,294,852 B2

(12) United States Patent
Adachi et al.

(10) Patent No.: US 8,294,852 B2
(45) Date of Patent: Oct. 23, 2012

(54) LIQUID CRYSTAL DISPLAY DEVICE COMPRISING A COMBINATION OF O-TYPE POLARIZERS AND E-TYPE POLARIZERS

(75) Inventors: Masaya Adachi, Hitachi (JP); Takato Hiratsuka, Chiba (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 301 days.

(21) Appl. No.: 12/805,841

(22) Filed: Aug. 20, 2010

(65) Prior Publication Data
US 2011/0058128 A1    Mar. 10, 2011

(30) Foreign Application Priority Data
Sep. 8, 2009    (JP) .................................. 2009-207203

(51) Int. Cl.
G02F 1/1335    (2006.01)
C09K 19/02    (2006.01)

(52) U.S. Cl. ............................. 349/96; 349/99; 349/181

(58) Field of Classification Search ............ 349/96–100, 349/123, 127–130, 139, 134, 136, 181
See application file for complete search history.

(56) References Cited

U.S. PATENT DOCUMENTS

| | | | |
|---|---|---|---|
| 2004/0146663 A1 | 7/2004 | Paukshto et al. | |
| 2006/0230551 A1 | 10/2006 | Hasegawa et al. | |
| 2006/0268198 A1* | 11/2006 | Utsumi et al. | 349/96 |
| 2007/0058119 A1 | 3/2007 | Tasaka | |
| 2007/0200978 A1* | 8/2007 | Ishitani et al. | 349/96 |
| 2007/0242188 A1* | 10/2007 | Sakai | 349/96 |
| 2008/0088759 A1* | 4/2008 | Utsumi et al. | 349/42 |
| 2008/0192191 A1* | 8/2008 | Nakamura et al. | 349/117 |
| 2009/0027774 A1 | 1/2009 | Sano et al. | |
| 2010/0066949 A1 | 3/2010 | Utsumi et al. | |
| 2010/0171906 A1 | 7/2010 | Sakai | |

FOREIGN PATENT DOCUMENTS

| | | |
|---|---|---|
| CN | 101512400 | 8/2009 |
| EP | 2 060 936 | 5/2009 |
| JP | 2006-3864 | 1/2006 |
| JP | 2006-518871 | 8/2006 |
| JP | 2006-285219 | 10/2006 |
| JP | 2006-330215 | 12/2006 |
| JP | 2008-89966 | 4/2008 |
| JP | 2010-72140 | 4/2010 |

(Continued)

OTHER PUBLICATIONS

Pavel Lazarev et al.; P-116: Thin Crystal Films (TCF) for LCD Contrast Enhancement, SID 03 Digest, pp. 669-671.

(Continued)

*Primary Examiner* — Mark Robinson
*Assistant Examiner* — Paul Lee
(74) *Attorney, Agent, or Firm* — Antonelli, Terry, Stout & Kraus, LLP.

(57) ABSTRACT

An E-type polarizing layer is provided between a pair of orthogonally oriented O-type polarizing layers, and alternatively, an O-type polarizing layer and an E-type polarizing layer which are oriented orthogonal to each other are provided. When a liquid crystal layer has a slow axis, the E-type polarizing layer is disposed so that an absorption axis thereof is orthogonal to the slow axis. Therefore, a liquid crystal display device having a wide viewing angle is realized in which a contrast ratio is improved by suppressing a light leakage occurring when observed from an oblique direction.

14 Claims, 25 Drawing Sheets

FOREIGN PATENT DOCUMENTS

KR    10-2008-0047873    5/2008
KR    2008 0047873    5/2008

OTHER PUBLICATIONS

Takashi Tamaki, Journal of Japanese Liquid Crystal Society, EKISHO 2007, vol. 11, No. 1.

Yoshiaki Hisakado et al., Large Electro-optic Kerr Effect in Polymer-Stabilized Liquid-Crystalline Blue Phase, Advanced Materials, Jan. 6, 2005, pp. 96-98, vol. 17, No. 1.

P. Yeh et al., Molecular Crystalline Thin Film E-Polarizer, Molecular Materials, 2001, pp. 1-19, vol. 14.

\* cited by examiner

OBSERVER SIDE

HORIZONTAL DIRECTION
LEFT ⟷ RIGHT

ILLUMINATING DEVICE SIDE kx≫ky=kz kx≫ky=kz

OBSERVER SIDE

HORIZONTAL DIRECTION
LEFT ←——→ RIGHT

ILLUMINATING DEVICE SIDE

OBSERVER SIDE

HORIZONTAL DIRECTION
LEFT ⟷ RIGHT

ILLUMINATING DEVICE SIDE

OBSERVER SIDE

HORIZONTAL DIRECTION
LEFT ⟷ RIGHT

200: FIRST POLARIZING LAYER (O-TYPE)

300: LIQUID CRYSTAL LAYER

211: SECOND POLARIZING LAYER (E-TYPE)

ILLUMINATING DEVICE SIDE

NORMAL DIRECTION (VIEWING ANGLE 0°)

OBLIQUE DIRECTION

LIQUID CRYSTAL DISPLAY DEVICE COMPRISING A COMBINATION OF O-TYPE POLARIZERS AND E-TYPE POLARIZERS

CROSS-REFERENCE TO RELATED APPLICATION

The present application claims priority from Japanese application JP2009-207203 filed on Sep. 8, 2009, the content of which is hereby incorporated by reference into this application.

BACKGROUND OF THE INVENTION

1. Field of the Invention

The present invention relates to a liquid crystal display device, and more particularly, to a liquid crystal display device having at least two kinds of polarizing layers having different optical properties in order to broaden a viewing angle.

2. Description of the Related Art

Display devices are media that visually deliver information to people and have become very important instruments to people and societies in the modern highly advanced information world. The performance of liquid crystal display devices has been remarkably improved in recent years and used as display devices of various apparatuses such as cellular phones, personal computers, and large-screen televisions. A liquid crystal display device is generally realized by a liquid crystal display panel and a backlight (illuminating device) that is disposed on a rear side of the liquid crystal display panel so as to illuminate the liquid crystal display panel.

The liquid crystal display panel includes a pair of transparent substrates, a liquid crystal layer interposed between these transparent substrates, and a pair of polarizers disposed on outside surfaces of the respective transparent substrates opposite the liquid crystal layer. The liquid crystal display panel controls transmitted light quantity by changing the polarization state of light incident on the liquid crystal layer, thus displaying images.

The main contributing viewing angle property of the liquid crystal display panel includes the viewing angle properties of the polarizers and the viewing angle property of the liquid crystal layer.

Polarizers used in a liquid crystal display device are generally iodine-system polymer polarizers. Such polarizers are obtained, for example, by dyeing polyvinyl alcohol with iodine and stretching a thin film. Polarizers like the iodine-system polymer polarizers in which the arrangement direction of dye molecules is parallel to the absorption axis, the ordinary refractive index is smaller than the extraordinary refractive index, and the transmittance of ordinary wave is larger than that of extraordinary wave are referred to as O-type polarizing layers.

Particularly, in directions parallel to the absorption axis, the O-type polarizing layers have a lower degree of polarization with respect to light incident from an oblique direction than the normal direction. Therefore, this is one of the causes why the liquid crystal display device has a low contrast ratio in the oblique direction.

To solve this problem, an attempt for improving the viewing angle property of a liquid crystal display device by combining an E-type polarizing layer with an O-type polarizing layer is described, for example, in P. Lazarev et al., "Thin Crystal Films (TCF) for LCD Contrast Enhancement", SID 03 DIGEST, p 669-671, 2003. Here, the E-type polarizing layer refers to a polarizing layer which has an absorption axis in a direction vertical to the arrangement direction of dye molecules, and in which the extraordinary refractive index is smaller than the ordinary refractive index, and the transmittance of extraordinary wave is larger than that of ordinary wave. The E-type polarizing layer can be realized by orienting dyes disclosed, for example, in Takashi Tamaoki, Journal of the Japanese Liquid Crystal Society, Vol. 11, No. 1, 2007, p 37-45, JP-A-2006-3864("JP-A" means an unexamined published Japanese patent application), JP-T-2006-518871 ("JP-T" means a published Japanese translation of a PCT patent application)), and JP-A-2006-285219.

On the other hand, an in-plane switching (IPS) mode liquid crystal display device is known as a liquid crystal display device which improves the viewing angle property of a liquid crystal layer. Differing from other modes such as the vertical alignment (VA) mode or the twisted nematic (TN) mode, the IPS-mode liquid crystal display device has a configuration in which a pixel electrode and a common electrode for driving liquid crystals are formed on the same substrate, and movements of liquid crystal molecules are controlled by applying a potential difference between the electrodes and generating an electric field. Since the transmitted light quantity is mainly controlled by rotating the liquid crystal molecules on a plane parallel to a substrate plane, a wide viewing angle is obtained without causing a great decrease in the contrast ratio and a severe reversal of shading which are mainly caused by the liquid crystal layer when a screen is observed from an oblique direction.

SUMMARY OF THE INVENTION

In the IPS-mode liquid crystal display device, the deterioration in the viewing angle property resulting from the liquid crystal layer is small, whereas the viewing angle property of the polarizer is the main cause. The deterioration in the viewing angle property of interest in this specification is the decrease in the contrast ratio of images which is caused by a light leakage during black display and observed from an oblique direction.

In the IPS-mode liquid crystal display device, a pair (two sheets) of polarizing layers are disposed so that absorption axes thereof are orthogonal to each other when observed from the normal direction (viewing angle: 0°). Moreover, when the liquid crystal layer has the long axis (slow axis) of liquid crystal molecules, the polarizing layers are disposed so that the absorption axis of any one of the pair of polarizing layers is parallel to the molecular long axis.

FIGS. 28A and 28B are diagrams illustrating the cause of the deterioration in the viewing angle property of a pair of polarizing layers disposed so that the absorption axes thereof are orthogonal to each other when observed from the normal direction. Most of the existing polarizing layers of a liquid crystal display device are iodine-system polymer polarizers which are O-type polarizing layers. Therefore, the polarizing layer shown in FIGS. 28A and 28B is also an O-type polarizing layer.

As shown in FIG. 28A, when observed from the normal direction (viewing angle: 0°), an absorption axis 200A of a first polarizing layer disposed on the upper side (observer side) is orthogonal to an absorption axis 210A of a second polarizing layer disposed on the lower side, and a transmission axis 210T of the second polarizing layer is parallel to and identical to the absorption axis 200A of the first polarizing layer. Therefore, light passing through the second polarizing layer will be absorbed by the first polarizing layer. That is, when black display is performed, ideally no light leakage resulting from the polarizing layer will occur in the normal direction.

On the other hand, as shown in FIG. 28B, in directions deviated clockwise at an angle of 45° (or 135°) from the absorption axis of the first polarizing layer, when the first polarizing layer is observed from the oblique direction, the absorption axis 200A of the first polarizing layer is not orthogonal to the absorption axis 210A of the second polarizing layer, and the transmission axis 210T of the second polarizing layer deviates from the absorption axis 200A of the first polarizing layer. Thus, a light leakage occurs.

Therefore, when the first polarizing layer is observed from an oblique direction, for example, such that an azimuth angle and a polar angle (viewing angle) with respect to the absorption axis of the first polarizing layer are 45° and 45°, respectively, the transmission axis 210T of the second polarizing layer and the absorption axis 200A of the first polarizing layer will deviate from each other at an angle α of about 19.5°. Thus, the light leakage occurs.

That is, in the case of the liquid crystal display device using a pair of O-type polarizing layers, the absorption axes of the polarizing layers deviate from the orthogonal state when observed from the oblique direction. Thus, when black display is performed, the light leakage occurs, and thus the contrast ratio decreases. This is the main cause of the deterioration in the viewing angle property of the IPS-mode liquid crystal display device.

On the other hand, an attempt for improving the viewing angle property of a liquid crystal display device by incorporating an additional E-type polarizing layer is described, for example, in P. Lazarev et al., "Thin Crystal Films (TCF) for LCD Contrast Enhancement", SID 03 DIGEST, p 669-671, 2003. FIG. 29 is a schematic diagram showing a main part of a liquid crystal display device incorporating an E-type polarizing layer for improving the viewing angle property. In this related art, as shown in the figure, an E-type polarizing layer 1250 is disposed on an upper portion (observer side) of an upper polarizing layer 1200 formed by an O-type polarizer so that an absorption axis of the E-type polarizing layer 1250 is parallel to the absorption axis of the upper polarizing layer 1200. In this case, the additional polarizing layer improves the effective degree of polarization, and thus, the contrast ratio is improved over a wide range including the normal direction.

Particularly, at an azimuth angle parallel to the absorption axis of the upper polarizing layer 1200, namely the absorption axis of the E-type polarizing layer 1250, the contrast ratio when observed from the oblique direction is improved. This result is for the following reasons.

In the case of the O-type polarizing layer, in directions parallel to the absorption axis, the degree of polarization to light incident from the oblique direction is lower than that from the normal direction. To the contrary, ideally, in the case of the E-type polarizing layer, in directions parallel to the absorption axis, the degree of polarization to light incident from the oblique direction does not change from that from the normal direction. Therefore, by incorporating the E-type polarizing layer, at an azimuth angle parallel to the absorption axis of the E-type polarizing layer 1250, the contrast ratio when observed from the oblique direction is improved.

As described above, there has already been an attempt at improving the viewing angle property of the liquid crystal display device by using the E-type polarizing layer. However, this method is unable to solve the above-described problem, that is, the light leakage resulting from the tilting of the absorption axis which occurs when a pair of O-type polarizing layers of which the absorption axes are orthogonal to each other is observed from the oblique direction is not solved.

In consideration of such a situation, the present invention has been made to solve the problems of a conventional art, and an object of the present invention is to suppress a light leakage occurring when observed from the oblique direction and realize a higher contrast ratio in a liquid crystal display device having a pair of polarizing layers of which the absorption axes are orthogonal to each other.

In this specification, a mode, in which a pixel electrode and a common electrode are formed on different layers, at least an electrode disposed closer to the liquid crystal layer has an interdigital shape or a shape having slits, and a fringe field is formed so as to drive liquid crystals, will also be referred to as the IPS mode since some liquid crystal molecules rotate on the plane.

Other objects, other problems and novel features of the present invention will become apparent from the description of this specification and the accompanying drawings.

This application discloses various inventions, and representative inventions among them can be summarized as follows.

(1) A liquid crystal display device having a liquid crystal display panel including:
a first substrate;
a second substrate;
a liquid crystal layer interposed between the first substrate and the second substrate;
a pixel electrode and a common electrode formed on the second substrate so as to drive the liquid crystal layer;
a first polarizing layer provided on the first substrate side of the liquid crystal layer;
a second polarizing layer provided on the second substrate side of the liquid crystal layer, the absorption axes of the first and second polarizing layers being orthogonal to each other, and both the first and second polarizing layers being O-type polarizing layers; and
a third polarizing layer which is either an E-type polarizing layer having an absorption axis parallel to an absorption axis of the first polarizing layer and disposed between the first polarizing layer and the liquid crystal layer or an E-type polarizing layer having an absorption axis parallel to an absorption axis of the second polarizing layer and disposed between the second polarizing layer and the liquid crystal layer,
wherein liquid crystal molecules constituting the liquid crystal layer are oriented in parallel to at least a substrate plane of the first and second substrates, and a molecular long axis thereof is orthogonal to an absorption axis of the third polarizing layer.

(2) A liquid crystal display device having a liquid crystal display panel including:
a first substrate;
a second substrate;
a liquid crystal layer interposed between the first substrate and the second substrate;
a pixel electrode and a common electrode formed on the second substrate so as to drive the liquid crystal layer;
a first polarizing layer provided on the first substrate side of the liquid crystal layer; and
a second polarizing layer provided on the second substrate side of the liquid crystal layer, the absorption axes of the first and second polarizing layers being orthogonal to each other, and one of the first and second polarizing layers being an O-type polarizing layer, and the other being an E-type polarizing layer;

wherein liquid crystal molecules constituting the liquid crystal layer are oriented in parallel to at least a substrate plane of the first and second substrates, and a molecular long axis thereof is orthogonal to an absorption axis of a polarizing layer which is formed by the E-type polarizing layer among the first and second polarizing layers.

(3) A liquid crystal display device having a liquid crystal display panel including:
  a first substrate;
  a second substrate;
  a liquid crystal layer interposed between the first substrate and the second substrate;
  a pixel electrode and a common electrode formed on the second substrate so as to drive the liquid crystal layer;
  a first polarizing layer provided on the first substrate side of the liquid crystal layer;
  a second polarizing layer provided on the second substrate side of the liquid crystal layer, the absorption axes of the first and second polarizing layers being orthogonal to each other, and both the first and second polarizing layers being O-type polarizing layers; and
  a third polarizing layer which is either an E-type polarizing layer having an absorption axis parallel to an absorption axis of the first polarizing layer and disposed between the first polarizing layer and the liquid crystal layer or an E-type polarizing layer having an absorption axis parallel to an absorption axis of the second polarizing layer and disposed between the second polarizing layer and the liquid crystal layer,
  wherein the liquid crystal layer has a property such that an optically anisotropic state occurs from an optically isotropic state in response to voltage application.

(4) A liquid crystal display device having a liquid crystal display panel including:
  a first substrate;
  a second substrate;
  a liquid crystal layer interposed between the first substrate and the second substrate;
  a pixel electrode and a common electrode formed on the second substrate so as to drive the liquid crystal layer;
  a first polarizing layer provided on the first substrate side of the liquid crystal layer; and
  a second polarizing layer provided on the second substrate side of the liquid crystal layer, the absorption axes of the first and second polarizing layers being orthogonal to each other, and one of the first and second polarizing layers being an O-type polarizing layer, and the other being an E-type polarizing layer,
  wherein the liquid crystal layer has a property such that an optically anisotropic state occurs from an optically isotropic state in response to voltage application.

(5) The liquid crystal display device according to (1), wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $kx=kz>ky$.

(6) The liquid crystal display device according to (2), wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $kx=kz>ky$.

(7) The liquid crystal display device according to (1), wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $1.3 \geq kx/kz \geq 0.5$ if $kx/ky \geq 5$ and a relation of $kx/kz \leq 2.0$ if $kx/ky \geq 10$.

(8) The liquid crystal display device according to (2), wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $1.3 \geq kx/kz \geq 0.5$ if $kx/ky \geq 5$ and a relation of $kx/kz \leq 2.0$ if $kx/ky \geq 10$.

(9) The liquid crystal display device according to (1),
  wherein the first polarizing layer is formed on a surface of the first substrate opposite to the surface close to the liquid crystal layer,
  wherein the second polarizing layer is formed on a surface of the second substrate opposite to the surface close to the liquid crystal layer,
  wherein the third polarizing layer is formed either between the first polarizing layer and the first substrate or between the second polarizing layer and the second substrate.

(10) The liquid crystal display device according to (2),
  wherein the first polarizing layer is formed on a surface of the first substrate opposite to the surface close to the liquid crystal layer, and
  wherein the second polarizing layer is formed on a surface of the second substrate opposite to the surface close to the liquid crystal layer.

(11) The liquid crystal display device according to (3), wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $kx=kz>ky$.

(12) The liquid crystal display device according to (4), wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $kx=kz>ky$.

(13) The liquid crystal display device according to (3), wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $1.3 \geq kx/kz \geq 0.5$ if $kx/ky \geq 5$ and a relation of $kx/kz \leq 2.0$ if $kx/ky \geq 10$.

(14) The liquid crystal display device according to (4), wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $1.3 \geq kx/kz \geq 0.5$ if $kx/ky \geq 5$ and a relation of $kx/kz \leq 2.0$ if $kx/ky \geq 10$.

(15) The liquid crystal display device according to (3),
  wherein the first polarizing layer is formed on a surface of the first substrate opposite to the surface close to the liquid crystal layer,
  wherein the second polarizing layer is formed on a surface of the second substrate opposite to the surface close to the liquid crystal layer, wherein the third polarizing layer is formed either between the first polarizing layer and the first substrate or between the second polarizing layer and the second substrate.

(16) The liquid crystal display device according to (4), wherein the first polarizing layer is formed on a surface of the first substrate opposite to the surface close to the liquid crystal layer, and wherein the second polarizing layer is formed on a surface of the second substrate opposite to the surface close to the liquid crystal layer.

(17) The liquid crystal display device according to (9), wherein the surface of the first substrate opposite to the surface close to the liquid crystal layer is an observer side.

(18) The liquid crystal display device according to (15), wherein the surface of the first substrate opposite to the surface close to the liquid crystal layer is an observer side.

According to the present invention, it is possible to suppress a light leakage occurring when a pair of polarizing layers disposed so that absorption axes thereof are orthogonal to each other when observed from a normal direction is observed from an oblique direction. Moreover, it is possible to improve a contrast ratio when a liquid crystal display panel and a liquid crystal display device having a liquid crystal layer between a pair of polarizing layers are observed from an oblique direction.

DETAILED DESCRIPTION OF THE INVENTION

Although the present invention will be described by way of embodiments with reference to the accompanying drawings, it should be noted that various changes and modifications can be made, and combinations of the embodiments below are also included in the present invention.

The present invention effectively improves the contrast ratio of a liquid crystal display device when observed from an oblique direction by using a different behavior of the change in the absorption axes of an O-type polarizing layer and an E-type polarizing layer when a polarizing layer is observed from an oblique direction. In addition, there is a case of an adverse effect resulted in a simple combination of the O-type polarizing layer and the E-type polarizing layer. In this case, an effective means is realized by defining the absorption axis of the E-type polarizing layer, the disposed position thereof, and the state of the liquid crystal layer.

A liquid crystal display device of the first embodiment includes a pair of O-type polarizing layers of which the absorption axes are orthogonal to each other, a liquid crystal layer disposed between the pair of O-type polarizing layers, and an E-type polarizing layer provided between the liquid crystal layer and either one of the O-type polarizing layers. In this case, when observed from a normal direction, the absorption axis of the E-type polarizing layer is parallel to the absorption axis of the adjacent O-type polarizing layer.

Figure 1:
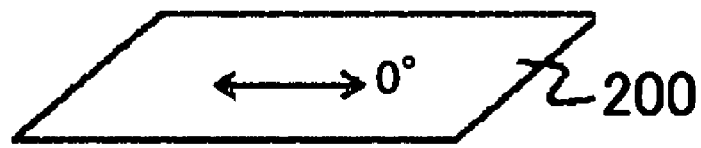
FIG. 1 is an illustrative diagram of a liquid crystal display device according to a first embodiment, showing an example of the relationship between the positions and the optical axes (absorption axes and liquid crystal molecular long axis) of the main parts thereof, which are a pair of O-type polarizing layers, a liquid crystal layer, and an E-type polarizing layer.
Figure 1:
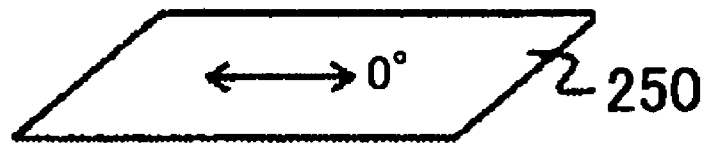
Figure 1:
Figure 1:
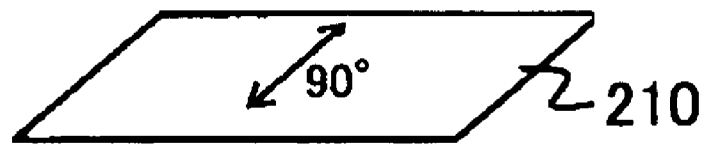

FIG. 1 is an illustrative diagram of a first embodiment of a liquid crystal display device according to the present invention, showing an example of the relationship between the positions and the optical axes (absorption axes and liquid crystal molecular long axis) of the main parts of the first embodiment, which are a pair of O-type polarizing layers, a liquid crystal layer, and an E-type polarizing layer.

As shown in FIG. 1, the liquid crystal display device of the first embodiment includes a first polarizing layer 200 disposed on the observer side and a second polarizing layer 210 disposed on the illuminating device (backlight) side. Both the first and second polarizing layers 200 and 210 are O-type polarizing layers, and a liquid crystal layer 300 is provided between them. In addition, a third polarizing layer 250 is provided between the liquid crystal layer 300 and the first polarizing layer 200.

In the following description, the horizontal direction (left-right direction) when the observer observes the liquid crystal display device is used as the reference. In addition, the right direction corresponds to an azimuth angle of 0°, and the azimuth angle will be defined in the clockwise direction. Then, the absorption axis of the first polarizing layer 200 is at an angle of 0° (and)180°, and the absorption axis of the second polarizing layer 210 is orthogonal to the absorption axis of the first polarizing layer 200 and is at an angle of 90° (and)270°. Although the absorption axis of the polarizing layer and the azimuth angle of the molecular long axis (the slow axis of the liquid crystal layer) of liquid crystals can be defined by two angles which are deviated at 180°, only one azimuth angle will be used in the following description.

The absorption axis of the third polarizing layer 250 is parallel to the absorption axis of the first adjacent polarizing layer 200 and is at an angle of 0°. In addition, the slow axis of the liquid crystal layer 300, that is, the direction of the molecular long axis of the liquid crystal molecules constructing the liquid crystal layer 300 is orthogonal to the third polarizing layer 250 which is an E-type polarizing layer and is at an azimuth angle of 90°. In the liquid crystal display device of the present embodiment, the liquid crystal molecules constructing the liquid crystal layer are in a homogeneous alignment state, and the molecular long axis thereof is orthogonal to the absorption axis of the E-type polarizing layer.

The O-type polarizing layer and the E-type polarizing layer will be described using an extinction coefficient k of each axis direction in an orthogonal coordinate system which is constructed by two main axes (x and y axes) orthogonal in the in-plane direction and an axis (z axis) of a thickness direction orthogonal to these axes. The extinction coefficient k and the absorption coefficient a have the relation of Expression (1) where $\lambda$ is a wavelength.

$$a = 4\pi k/\lambda \quad (1)$$

That is, if the wavelength is constant, the extinction coefficient k and the absorption coefficient a can be handled in the same manner. Here, similarly to an index ellipsoid which is used when handling a material having birefringence properties, a material having absorption anisotropy such as a polarizing layer will be discussed using an ellipsoid (hereinafter referred to as an absorption ellipsoid) which is expressed by the extinction coefficients $k_x$, $k_y$, and $k_z$ with respect to the x, y, and z axes.

Figure 2:
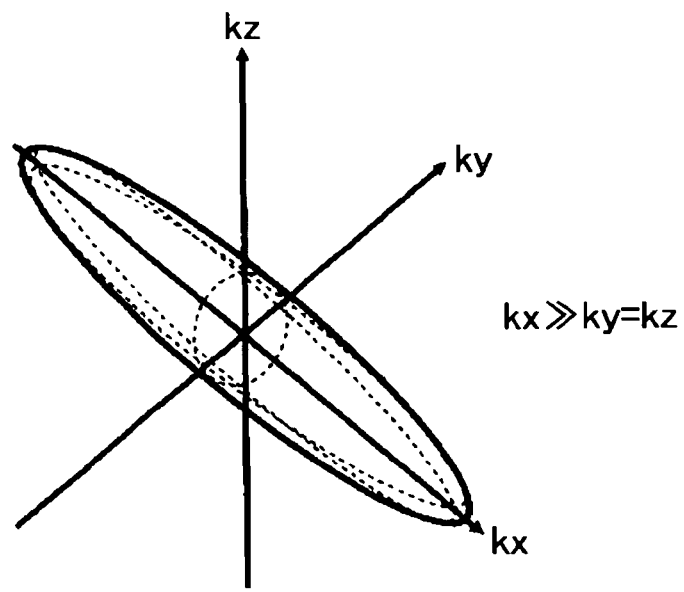
FIG. 2 is a schematic diagram of an absorption ellipsoid showing an O-type polarizing layer.

FIG. 2 is a schematic diagram of an absorption ellipsoid showing an O-type polarizing layer having an absorption axis on the x-axis direction. In this specification, the O-type polarizing layer is defined as a polarizing layer of which the ordinary refractive index is smaller than the extraordinary refractive index, and the transmittance of ordinary wave is larger than that of extraordinary wave. In addition, the O-type polarizing layer has a property such that an extinction coefficient $k_x$ in the absorption axis direction, namely the x-axis direction is larger than an extinction coefficient $k_y$ in the direction orthogonal to the absorption axis on the plane, namely the y-axis direction, and an extinction coefficient $k_z$ in the thickness direction, namely the z-axis direction, and $k_y$ and $k_z$ are equal, or substantially equal, to each other.

Figure 3:
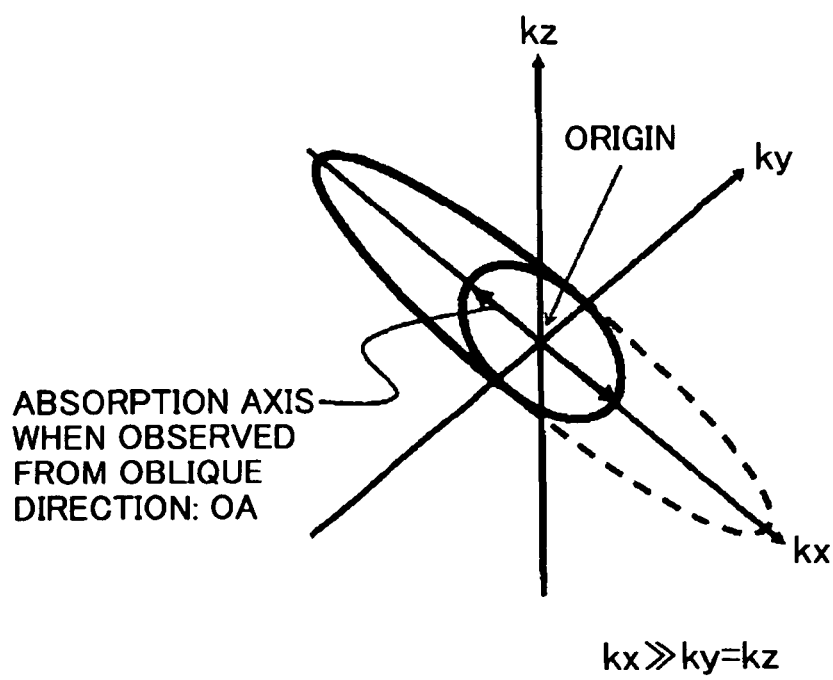
FIG. 3 is an illustrative diagram of an absorption axis when an O-type polarizing layer is observed from an oblique direction.

FIG. 3 is an illustrative diagram of an absorption axis when an O-type polarizing layer is observed from an oblique direction, schematically showing an absorption ellipsoid when observed from an oblique direction in directions tilted clockwise at an angle of 45° from the absorption axis (x axis). The direction of the absorption axis OA when the polarizing layer is observed from the oblique direction can be determined from a sectional shape including the origin when the absorption ellipsoid is observed from the observing direction. That is, the shape of the section including the origin when observed from the observing direction becomes an ellipsoid, and the long-axis direction of the ellipsoid can be considered as the absorption axis OA. For example, in the case of an O-type polarizing layer where $k_x \gg k_y \approx k_z$ like an iodine-system polymer polarizer, the direction of the absorption axis OA when observed from the oblique direction is identical to the x-axis direction.

Figure 4:
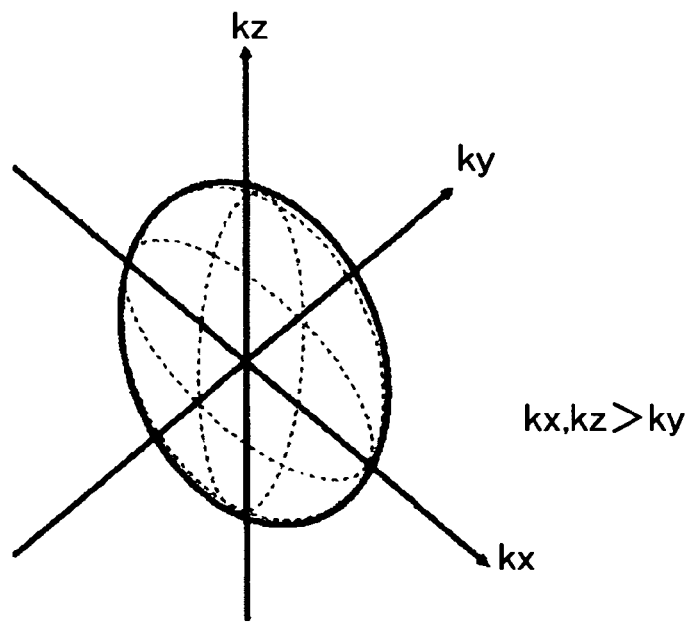
FIG. 4 is a schematic diagram of an absorption ellipsoid showing an E-type polarizing layer.

FIG. 4 is a schematic diagram of an absorption ellipsoid showing an E-type polarizing layer having an absorption axis on the x-axis direction. In this specification, the E-type polarizing layer is defined as a polarizing layer which has an absorption axis on the direction perpendicular to the arrangement direction of dye molecules, and of which the extraordinary refractive index is smaller than the ordinary refractive index, and the transmittance of extraordinary wave is larger than that of ordinary wave. In addition, the E-type polarizing layer has a property such that an extinction coefficient kx in the absorption axis direction, namely the x-axis direction and an extinction coefficient kz in the thickness direction, namely the z-axis direction are both larger than an extinction coefficient ky in the direction orthogonal to the absorption axis on the plane, namely the y-axis direction.

Figure 5:
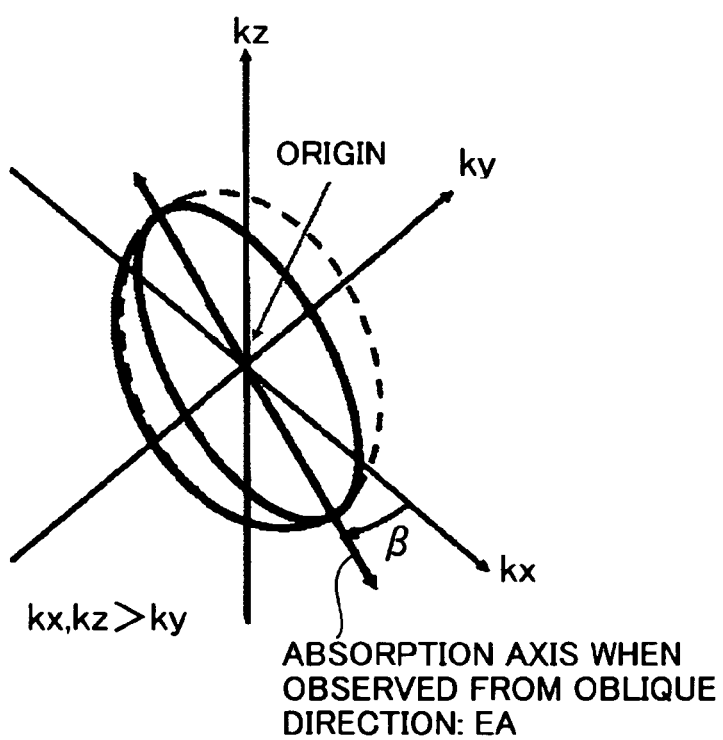
FIG. 5 is an illustrative diagram of an absorption axis when an E-type polarizing layer is observed from an oblique direction.

FIG. 5 is an illustrative diagram of an absorption axis when an E-type polarizing layer is observed from an oblique direction, schematically showing an absorption ellipsoid when observed from an oblique direction in directions tilted at an angle of 45° from the absorption axis (x axis). The direction of the absorption axis EA when the polarizing layer is observed from the oblique direction can be determined from a sectional shape including the origin when the absorption ellipsoid is observed from the observing direction. That is, the shape of the section including the origin when observed from the observing direction becomes an ellipsoid, and the long-axis direction of the ellipsoid can be considered as the absorption axis EA. For example, in the case of an E-type polarizing layer where kx, kz>ky, the direction of the absorption axis EA when observed from the oblique direction deviates clockwise at an angle of β from the x-axis.

That is, the E-type polarizing layer and the O-type polarizing layer have the absorption axes (EA, OA) on the same direction when observed from the normal direction, but the directions of the absorption axes (EA, OA) are different when observed from the oblique direction. Utilizing this property and controlling the angle β by adjusting the magnitude relationship between kx, ky, and kz of the E-type polarizing layer, the light leakage observed from the oblique direction occurring when a pair of O-type polarizing layers of which the absorption axes are orthogonal to each other may be suppressed.

Figure 28A:
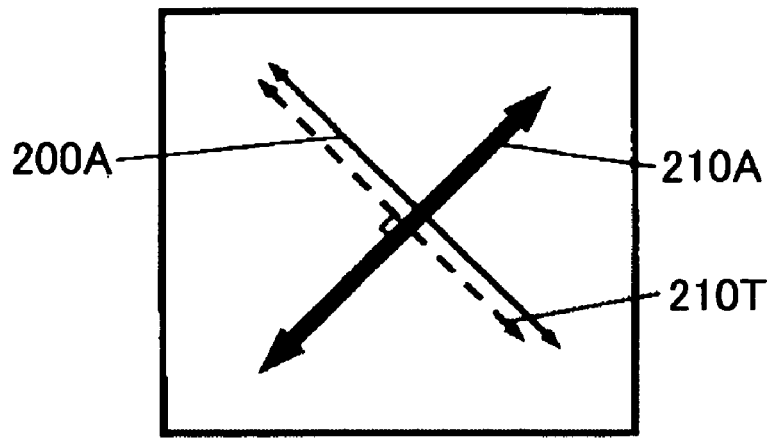
FIG. 28A is an illustrative diagram for explaining the causes of deterioration in the viewing angle property of a pair of O-type polarizing layers of which the absorption axes are orthogonal to each other.
Figure 28B:
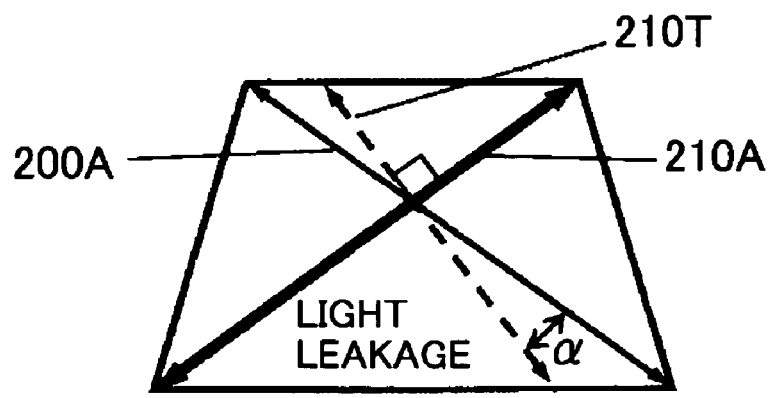
FIG. 28B is an illustrative diagram for explaining the causes of deterioration in the viewing angle property of a pair of O-type polarizing layers of which the absorption axes are orthogonal to each other.
Figure 29:
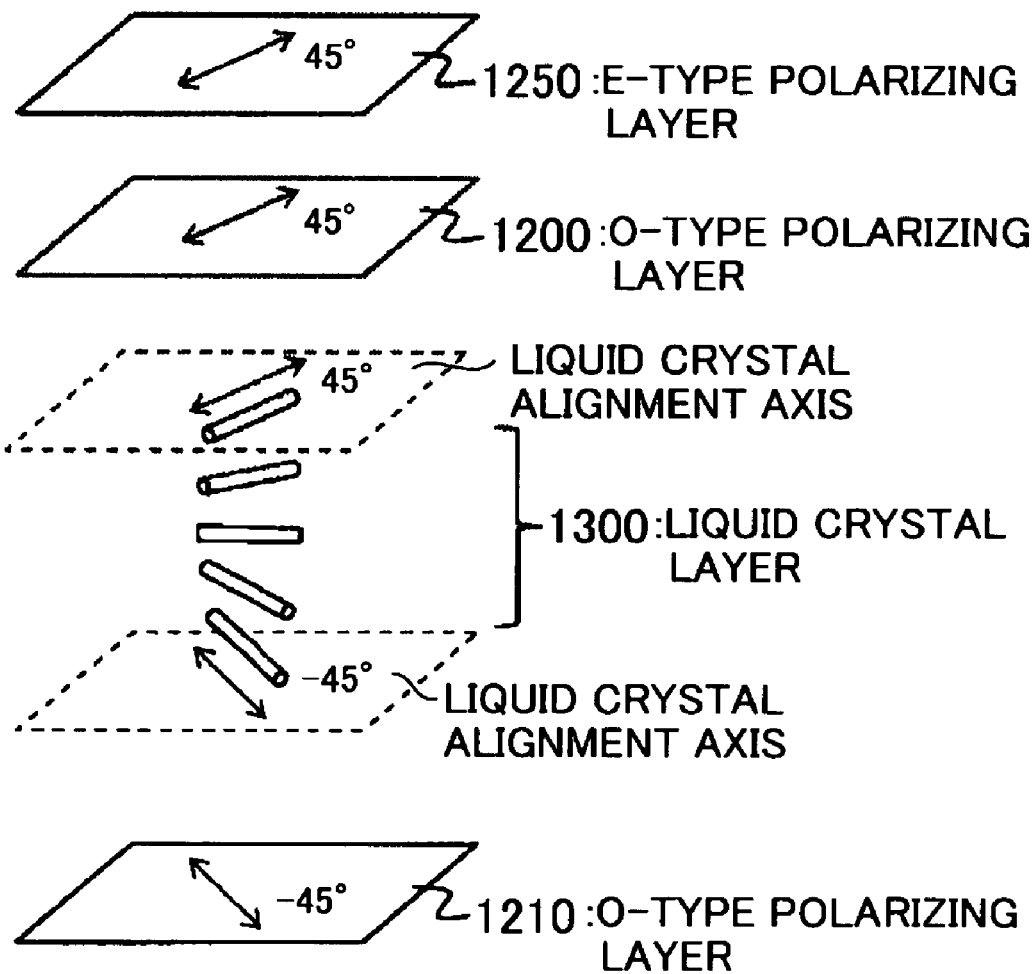
FIG. 29 is an illustrative diagram of the main parts of a liquid crystal display device of the related art.

As described above with reference to FIGS. 28A and 28B, when a pair of O-type polarizing layers of which the absorption axes are orthogonal to each other when observed from the normal direction is observed from an oblique direction in directions different from directions parallel to the absorption axes of the polarizing layers, the absorption axis 200A of the first polarizing layer and the absorption axis 210A of the second polarizing layer will deviate from the orthogonal state (see FIG. 28B). Therefore, the transmission axis 210T of the second polarizing layer and the absorption axis 200A of the first polarizing layer will also deviate, and a light leakage will occur. For example, when a polarizing layer is observed from an oblique direction such that an azimuth angle and a polar angle (viewing angle) with respect to the absorption axis of the polarizing layer are 45° (clockwise) and 45°, respectively, the transmission axis 210T of the second polarizing layer and the absorption axis 200A of the first polarizing layer will deviate from each other at an angle α of about 19.5°. Thus, the light leakage will occur. This value is calculated without considering a difference between the refractive indices of the polarizing layer and air. For example, if the refractive index of the polarizing layer is 1.5, due to refraction of light, the polar angle within the polarizing layer will be 28.1°, and the transmission axis 210T of the second polarizing layer and the absorption axis 200A of the first polarizing layer will deviate from each other at an angle α of about 7.2°.

The present invention compensates for the axis deviation by combining an E-type polarizing layer and an O-type polarizing layer and suppresses the light leakage. That is, the present invention suppresses the light leakage in the oblique direction by making the angle β (see FIG. 5) between the x axis and the absorption axis of the E-type polarizing layer when observed from an oblique direction at least closer to the axis deviation angle α (see FIG. 28B) when a pair of O-type polarizing layers having orthogonal absorption axes is observed from an oblique direction, and more preferably, making the angle β identical to the angle α.

In other words, by making the angle of the absorption axis of the third polarizing layer (250), which is constructed by an E-type polarizing layer, when observed from the oblique direction closer to the transmission axis angle of the second polarizing layer (210) which is constructed by an O-type polarizing layer, and more preferably, making the absorption axis angle of the third polarizing layer (E-type, 250) identical to the transmission axis angle of the second polarizing layer (O-type, 210), light having passed through the second polarizing layer (O-type, 210) can be effectively absorbed by the third polarizing layer (E-type, 250). Thus, the light leakage when observed from the oblique direction can be suppressed.

Figure 6:
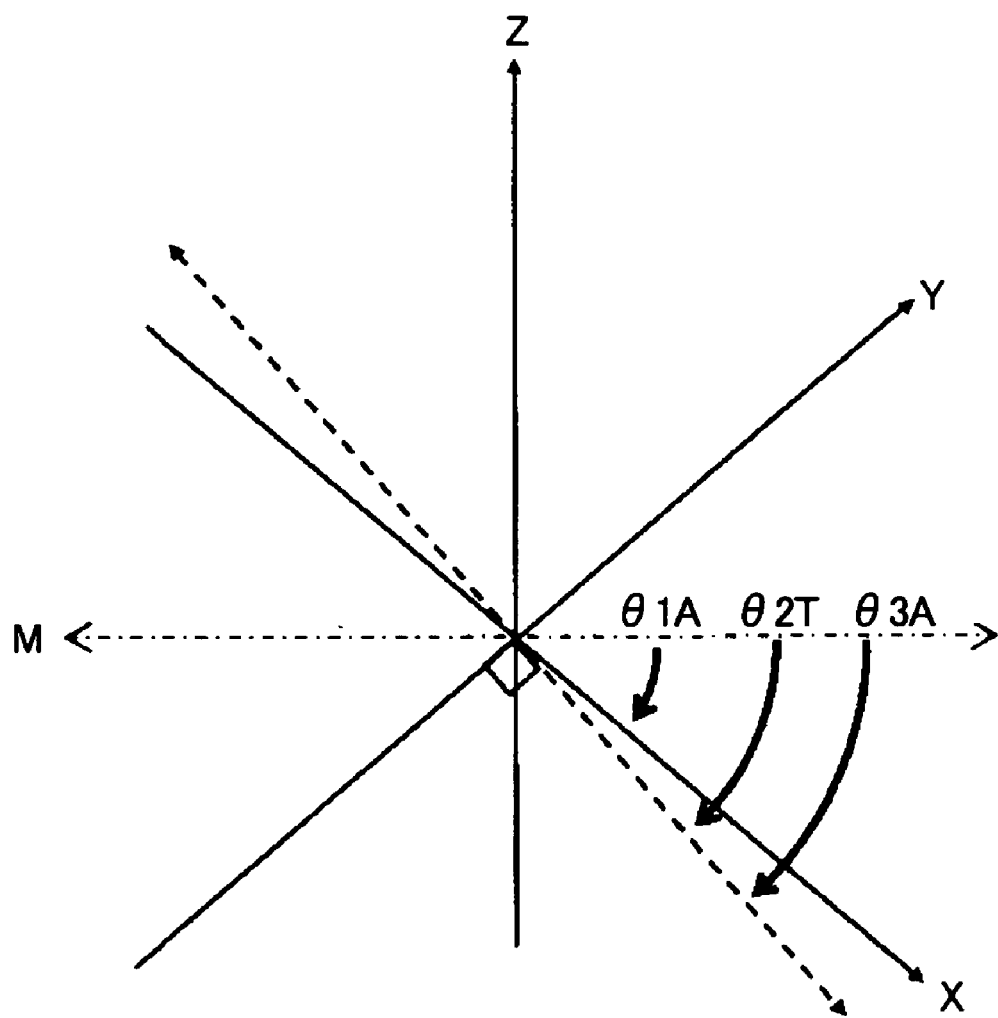
FIG. 6 is an illustrative diagram for explaining the definition of absorption axis angles of a first and a third polarizing layer and a transmission axis angle of a second polarizing layer when observed from an oblique direction.

FIG. 6 is a diagram for explaining the definition of an absorption axis angle of each polarizing layer when observed from an oblique direction (polar angle: 45°) in directions tilted clockwise at an angle of 45° from the x axis if the absorption axes of the first and third polarizing layers as observed from the normal direction are in the x-axis direction, and the absorption axis of the second polarizing layer is in the y-axis direction. In this specification, the direction of the central axis of the x and y axes, namely an axis tilted counter-clockwise at an angle of 45° from the x axis when observed from the normal direction, will be defined as a reference axis M. Shown in the figure, angles will be defined in the clockwise direction on the basis of the reference axis M. Specifically, θ1A is the absorption axis angle of the first polarizing layer (O-type, 200), θ2T is the transmission axis angle of the second polarizing layer (O-type, 210), and θ3A is the absorption axis angle of the third polarizing layer (E-type, 250).

In addition, Δθ12 is a difference between the absorption axis angle of the first polarizing layer (O-type, 200) and the transmission axis angle of the second polarizing layer (O-type, 210), and Δθ23 is a difference between the absorption axis angle of the third polarizing layer (E-type, 250) and the transmission axis angle of the second polarizing layer (O-type, 210).

Figure 7:
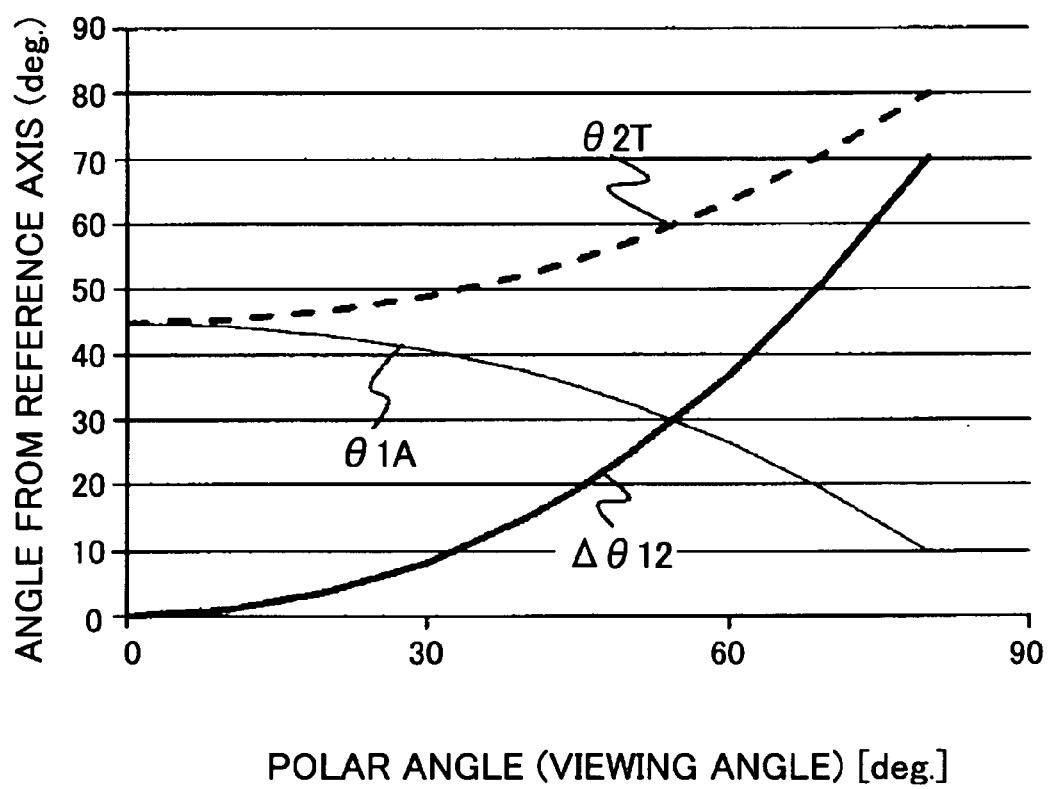
FIG. 7 is a diagram showing the viewing angle dependence of a difference between an absorption axis angle of a first polarizing layer and a transmission axis angle of a second polarizing layer.

FIG. 7 is a diagram showing the viewing angle (polar angle) dependence of the absorption axis angle θ1A of the first polarizing layer (O-type, 200), the transmission axis angle θ2T of the second polarizing layer (O-type, 210), and the difference Δθ12 of the absorption axis angle of the first polarizing layer (O-type, 200) and the transmission axis angle of the second polarizing layer (O-type, 210) in directions tilted clockwise at an angle of 45° from the x axis when the absorption axis of the first polarizing layer (O-type, 200) is made identical to the x axis.

As shown in the figure, in the case of using a pair of O-type polarizing layers, when the viewing angle increases, the absorption axis angle θ1A of the first polarizing layer (O-type, 200) decreases, and the transmission axis angle θ2T of the second polarizing layer (O-type, 210) increases. Therefore, the difference Δθ12 thereof increases. That is, when the viewing angle increases, the proportion of light being absorbed by the first polarizing layer (O-type, 200) after having passed through the second polarizing layer (O-type, 210) decreases, and thus, the light leakage increases.

Figure 8:
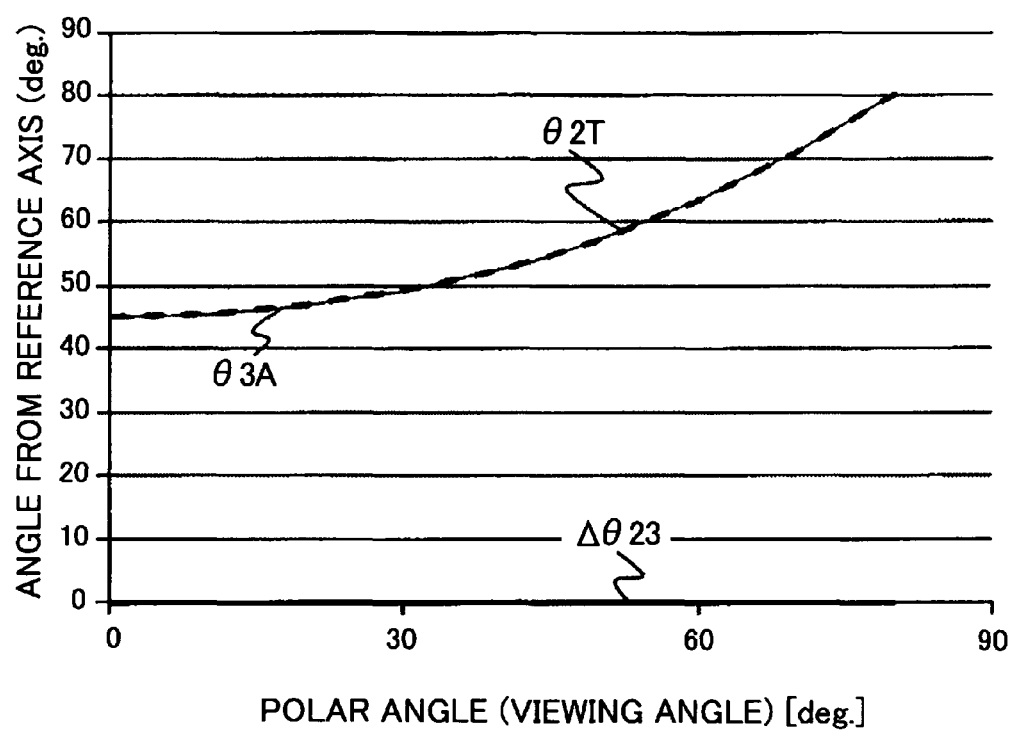
FIG. 8 is a diagram showing the viewing angle dependence of a difference between an absorption axis angle of a third polarizing layer and a transmission axis angle of a second polarizing layer.

To the contrary, in the first embodiment, an E-type polarizing layer (250) of which the absorption axis is parallel to the absorption axis of the first polarizing layer (O-type, 200) is used as the third polarizing layer. FIG. 8 is a diagram showing the viewing angle (polar angle) dependence of the absorption axis angle θ3A of the third polarizing layer (E-type, 250), the transmission axis angle θ2T of the second polarizing layer (O-type, 210), and the difference Δθ23 of the absorption axis angle of the third polarizing layer (E-type, 250) and the transmission axis angle of the second polarizing layer (O-type, 210) at an azimuth angle of 45° (clockwise) to the x axis when an E-type polarizing layer of which the extinction coefficients satisfy the relation of kx=kz>ky is used as the third polarizing layer.

As shown in the figure, when the viewing angle increases, the transmission axis angle θ2T of the second polarizing layer (O-type, 210) increases. Similarly, in the case of using an E-type polarizing layer as the third polarizing layer, when the viewing angle increases, the absorption axis angle θ3A of the third polarizing layer (E-type, 250) also increases. In particular, when the extinction coefficients satisfy the relation of kx=kz>ky, since the absorption axis angle θ3A of the third polarizing layer (E-type, 250) is substantially identical to the transmission axis angle θ2T of the second polarizing layer (O-type, 210), the difference Δθ23 thereof will be substantially 0° regardless of the viewing angle. Therefore, even when the viewing angle increases, light having passed through the second polarizing layer (O-type, 210) can be effectively absorbed by the third polarizing layer (E-type, 250). Thus, the light leakage when observed from the oblique direction can be suppressed.

Figure 9:
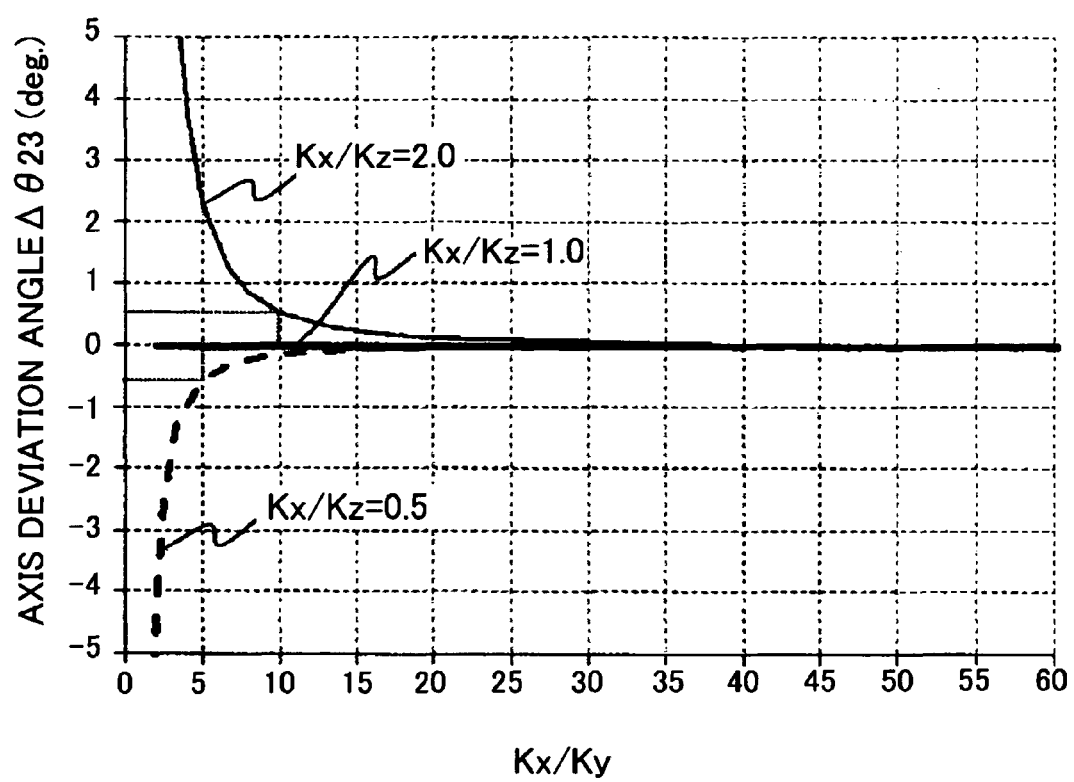
FIG. 9 is a diagram showing the relationship between the ratio of extinction coefficients of an E-type polarizing layer used as a third polarizing layer and a difference between an absorption axis angle of the third polarizing layer and an transmission axis angle of the second polarizing layer.

FIG. 9 is a diagram showing the relationship between the ratio of the extinction coefficients of the E-type polarizing layer used as the third polarizing layer and the difference Δθ23 between the absorption axis angle of the third polarizing layer and the transmission axis angle of the second polarizing layer.

When kx=kz, namely, when kx/kz=1.0, the light leakage can be effectively suppressed when observed from an oblique direction such that Δθ23 is 0°, regardless of kx/ky, namely the ratio of the extinction coefficients in the in-plane direction of the third polarizing layer.

However, it is practically difficult to realize an E-type polarizing layer of which the extinction coefficients perfectly satisfy the relation of kx=kz>ky. If it is assumed that a high light leakage suppressing effect equivalent to the case of kx=kz is obtained as long as the rate of increase in the light leakage is within 1% when kx/kz=1.0, the absolute value of Δθ23 only needs to be equal to or smaller than 0.57°. Specifically, as shown in FIG. 9, the extinction coefficients of the third polarizing layer only need to satisfy the relation of kx/ky≧5 if kx/kz=0.5 and the relation of kx/ky≧10 if kx/kz=2.0.

On the other hand, when the value of kx/ky increases, the value of Δθ23 tends to decrease. Therefore, in order to obtain a higher light leakage suppressing effect, it is preferable that the value of kx/ky is large, specifically equal to or larger than 5, and more preferably, equal to or larger than 10.

In addition, under conditions other than kx/kz=1.0, the smaller the value of kx/kz than 1.0, the smaller is the value of Δθ23, and the higher light leakage suppressing effect is obtained when observed from the oblique direction. That is, if it is difficult to make kx/kz=1.0, by using a polarizing layer of which the extinction coefficient kz in the thickness direction is larger than the extinction coefficient kx in the in-plane direction, it is possible to obtain a higher light leakage suppressing effect when observed from the oblique direction.

Figure 10:
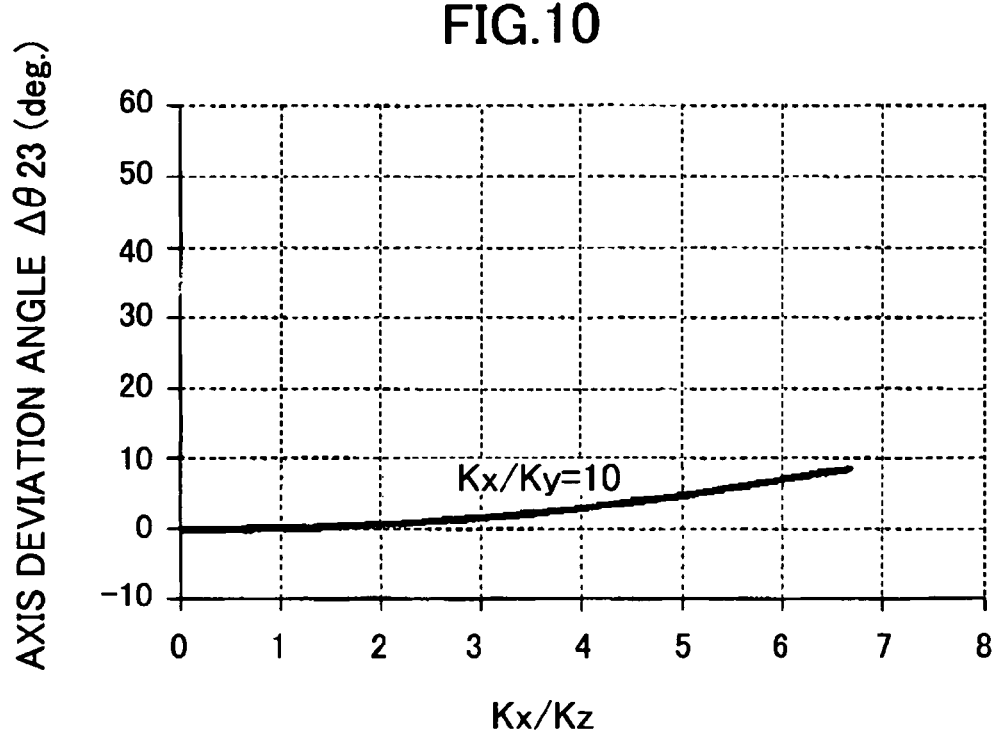
FIG. 10 is a diagram showing the relationship between kx/kz when kx/ky=10 and a difference between the absorption axis angle of the third polarizing layer and the transmission axis angle of the second polarizing layer.
Figure 11:
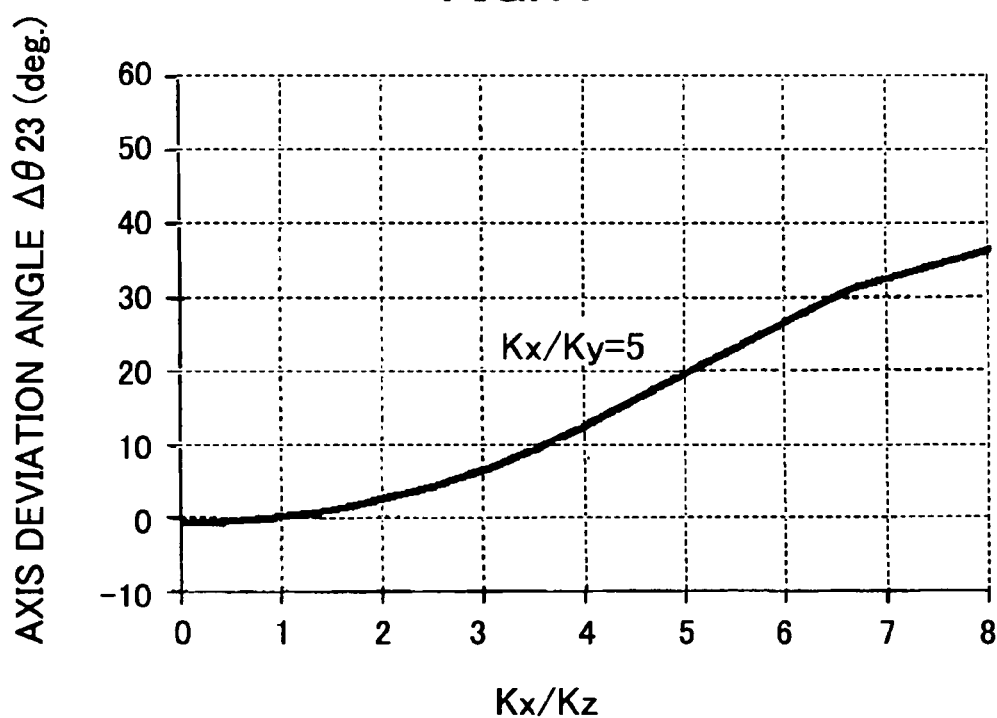
FIG. 11 is a diagram showing the relationship between kx/kz when kx/ky=5 and a difference between the absorption axis angle of the third polarizing layer and the transmission axis angle of the second polarizing layer.

FIGS. 10 and 11 are diagrams showing the relationship between kx/kz and the axis deviation angle Δθ23 when kx/ky=10 and when kx/ky=5, respectively. As described above, in any of the cases, when kx/kz=1.0, Δθ23 becomes 0°, and a higher light leakage suppressing effect can be obtained when observed from the oblique direction.

In this case, if it is assumed that a high light leakage suppressing effect equivalent to the case of kx=kz can be obtained as long as the rate of increase in the light leakage can be suppressed to be 1% or less compared to the case of kx/kz=1.0, the absolute value of Δθ23 only needs to be equal to or smaller than 0.57°. In this case, the extinction coefficients of the third polarizing layer (E-type, 250) only need to satisfy the relation of 1.3≧kx/kz≧0.5 if kx/ky≧5 and the relation of kx/kz≦2.0 if kx/ky≧10.

That is, as the value of kx/ky increases, the satisfactory range of kx/kz increases.

Next, the influence of the slow axis of a liquid crystal layer will be described. As described above, in a pair of O-type polarizing layers (200, 210) of which the absorption axes are orthogonal to each other, the light leakage occurring when observed from the oblique direction can be suppressed by using the above-described E-type polarizing layer of which the absorption anisotropy is defined by the ratio of extinction coefficients. Therefore, by using liquid crystals which are optically isotropic during no-voltage application, for example, so-called blue-phase isotropic liquid crystals as the liquid crystal layer 300, the light leakage in the oblique direction during the black display can be suppressed. Thus, it is possible to realize a liquid crystal display device having a high contrast ratio in the oblique direction and a wide viewing angle.

However, when a liquid crystal layer has an optically uniaxial anisotropy of refractive index during no-voltage application similar to the IPS mode, it is necessary to consider the relationship between the slow axis of the liquid crystal layer 300, namely the arrangement direction (liquid crystal arrangement direction) of the liquid crystal molecular long axis, and the absorption axis of the third polarizing layer 250.

Figure 12:
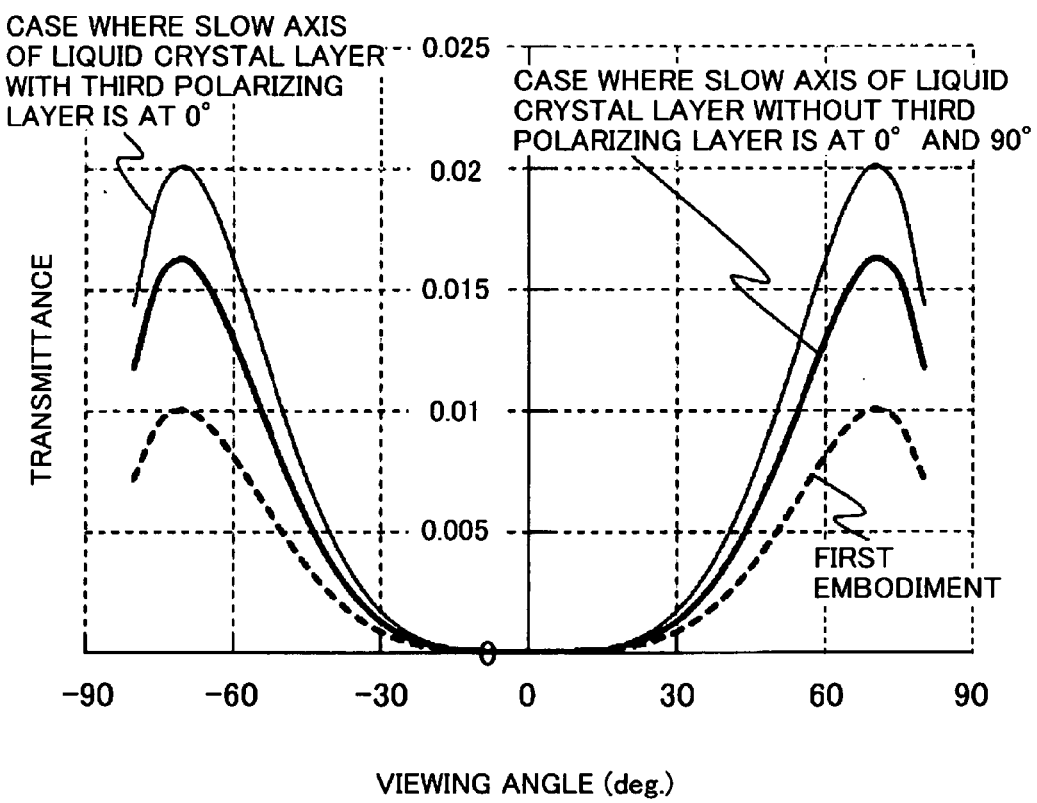
FIG. 12 is a diagram showing the viewing angle dependence of transmittance during the black display of the liquid crystal display device of the first embodiment.

FIG. 12 is a diagram showing the viewing angle dependence of transmittance during the black display of the liquid crystal display device of the present embodiment, namely for a case (broken line) where the absorption axes of the first and third polarizing layers 200 and 250 are both at an angle of 0°, the absorption axis of the second polarizing layer 210 is at an angle of 90°, and the slow axis of the liquid crystal layer 300 is at an angle of 90°. FIG. 12 shows the calculation results of the viewing angle dependence at an azimuth angle tilted at an angle of 45° from the absorption axis of the first polarizing layer 200. For comparison, FIG. 12 also shows the calculation results for a case (narrow solid line) where the slow axis angle of the liquid crystal layer 300 is changed to 0° and parallel to the absorption axis of the third polarizing layer 250 and a case (bold solid line) where the slow axis angle of the liquid crystal layer 300 is changed to 0° and 90° in a state where the third polarizing layer 250 is not provided. It should be noted that the calculation results are obtained for a case where the extinction coefficients of the third polarizing layer 250 satisfy the relation of kx/kz=1.0, namely kx=kz, and kx/ky=10.

In the case of the present embodiment, as compared to the related art where the third polarizing layer is not provided, since the third polarizing layer 250 is provided, the light leakage is suppressed particularly in the range of viewing angles of 20° or more, and thus, the transmittance decreases.

This is because the third polarizing layer 250 effectively absorbs light having passed through the second polarizing layer 210.

On the other hand, in the case where the third polarizing layer is provided similarly to the case of the present embodiment, under the condition where the slow axis of the liquid crystal layer 300 is parallel to the absorption axis of the third polarizing layer 250, the light leakage in the oblique direction increases more than that under the condition where the third polarizing layer 250 is not provided, and thus, the transmittance increases.

Figure 13:
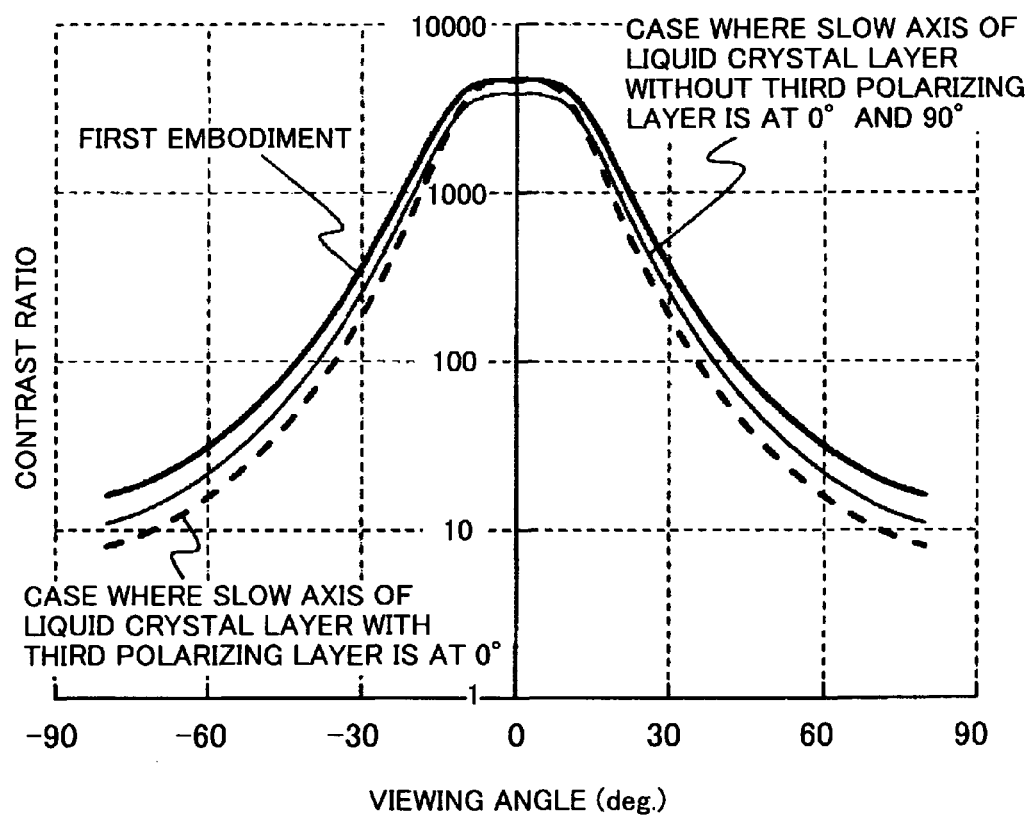
FIG. 13 is a diagram showing the viewing angle dependence of a contrast ratio of the liquid crystal display device of the first embodiment.

FIG. 13 shows the calculation results of the viewing angle dependence of a contrast ratio under the same conditions as FIG. 12. Comparing the case (bold solid line) of the present embodiment and the case (narrow solid line) of the related art where the third polarizing layer is not provided, in the case of the present embodiment where the third polarizing layer 250 is provided, the contrast ratio is improved particularly in the oblique direction, and a liquid crystal display device having a wider viewing angle can be realized. This is because light which leaks in the related art during the black display is effectively absorbed by the third polarizing layer 250.

On the other hand, in the case where the third polarizing layer is provided similarly to the case of the present embodiment, under the condition (broken line) where the slow axis of the liquid crystal layer 300 is parallel to the absorption axis of the third polarizing layer 250, the contrast ratio in the oblique direction decreases more than that under the condition where the third polarizing layer 250 is not provided. This is because the light leakage in the oblique direction increases during the black display regardless of the presence of the third polarizing layer, and thus, the transmittance increases.

As described above, in the present embodiment, in order to suppress the light leakage in the oblique direction and obtain a high contrast ratio, the slow axis of the liquid crystal layer when observed from the normal direction is made orthogonal to the absorption axis of the E-type polarizing layer.

Figure 14:
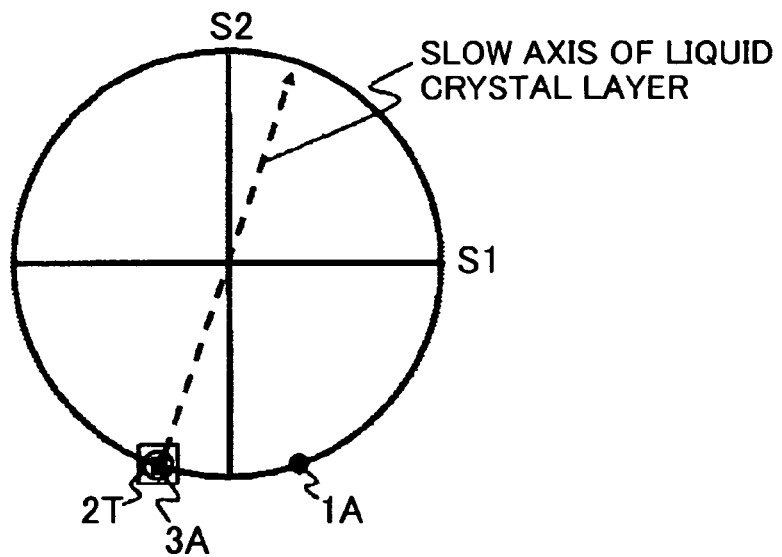
FIG. 14 is an illustrative diagram schematically showing the polarization state using the Poincare sphere when the liquid crystal display device of the first embodiment performs black display.
Figure 15:
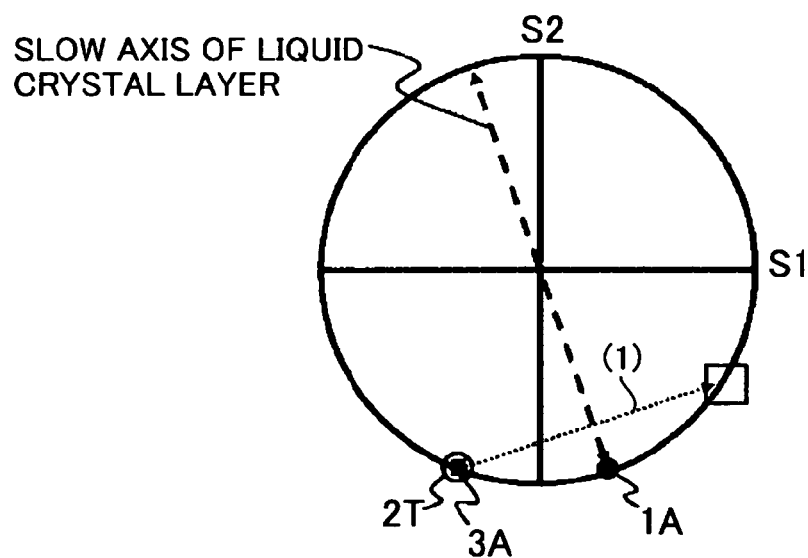
FIG. 15 is an illustrative diagram schematically showing the polarization state using the Poincare sphere when a liquid crystal display device in which the direction of the slow axis of the liquid crystal layer is different from that of the first embodiment performs black display.

Next, the reasons will be described briefly. FIGS. 14 and 15 are illustrative diagrams schematically showing the polarization state using the Poincare sphere when the liquid crystal display device performs black display. FIG. 14 is a diagram qualitatively showing the polarization state when the liquid crystal display device of the first embodiment is observed from an oblique direction in directions tilted at an angle of 45° from the absorption axis of the first polarizing layer. Moreover, FIG. 15 is a diagram qualitatively showing the polarization state when a liquid crystal display device in which the third polarizing layer is provided similarly to the first embodiment, but the slow axis of the liquid crystal layer is parallel to the absorption axis of the third polarizing layer is observed from an oblique direction similarly to FIG. 14.

In the figures, 1A (●) represents the absorption axis of the first polarizing layer 200, 2T (○) represents the transmission axis of the second polarizing layer 210, and 3A (■) represents the absorption axis of the third polarizing layer 250. In addition, the polarization state (□) after passing through the liquid crystal layer is also illustrated. It should be noted that FIGS. 14 and 15 are provided for the purpose of qualitative description and do not show the exact coordinates on the Poincare sphere.

As shown in FIG. 14, in the liquid crystal display device of the first embodiment, light passing through the liquid crystal layer 300 after having passed through the second polarizing layer 210 is incident to the third polarizing layer 250. Without being affected by the liquid crystal layer 300, the polarization state of the light passing through the liquid crystal layer 300 is not changed and the light passing through the liquid crystal layer 300 is incident to the third polarizing layer 250. Since the absorption axis of the third polarizing layer 250 is identical to the transmission axis of the second polarizing layer 210, the light passing through the liquid crystal layer 300 after having passed through the second polarizing layer 210 is effectively absorbed by the third polarizing layer 250. Thus, the light leakage in the oblique direction decreases, and a high contrast ratio is obtained.

On the other hand, as shown in FIG. 15, when the slow axis of the liquid crystal layer 300 is parallel to the absorption axis of the third polarizing layer 250, the light passing through the liquid crystal layer 300 after having passed through the second polarizing layer 210 is affected by the liquid crystal layer 300. Thus, the polarization state thereof is changed (see the movement indicated by arrow (1) in FIG. 15). Therefore, the polarization state of the light incident to the third polarizing layer 250 will deviate from the absorption axis of the third polarizing layer 250 and will not sufficiently be absorbed by the third polarizing layer 250. Moreover, since the polarization state of the light having passed through the third polarizing layer 250 is not identical to the absorption axis of the first polarizing layer 200, the light will leak without being sufficiently absorbed by the first polarizing layer 200.

As described above, in the present embodiment, in order to suppress the light leakage in the oblique direction, the slow axis of the liquid crystal layer 300 when observed from the normal direction is disposed so as to be orthogonal to the absorption axis of the third polarizing layer 250, namely the E-type polarizing layer.

When an iodine-system polymer polarizer is used as an O-type polarizing layer, a triacetylcellulose film is often used as a protection layer. In this case, the triacetylcellulose film has a negligibly small anisotropy of refractive index in the in-plane direction, but the refractive index in the thickness direction differs noticeably from the refractive index in the in-plane direction. Even when the protection layer of the polarizing layer has birefringence properties, the ideas of the present invention are effective if the birefringence is small, and from the qualitative perspective, the same advantages as the above can be obtained. However, in order to obtain a higher effect, it may be helpful to use an optically isotropic transparent medium as the protection layer of the polarizing layer, and alternatively, to implement optical design also considering the birefringence of the protection layer.

The liquid crystal display device of the present embodiment includes a liquid crystal display panel. The liquid crystal display panel includes the first to third polarizing layers (200, 210, and 250) and the liquid crystal layer 300 shown in FIG. 1, and further includes first and second transparent substrates interposing the liquid crystal layer 300 therebetween, which are not shown in FIG. 1. In the present embodiment, the first polarizing layer 200 is disposed on a surface of the first transparent substrate opposite to the surface close to the liquid crystal layer 300, the second polarizing layer 210 is disposed on a surface (backlight-side surface) of the second transparent substrate opposite to the surface close to the liquid crystal layer 300, and the third polarizing layer 250 is disposed between the first transparent substrate and the first polarizing layer 200.

As described above, although it is practical that the respective polarizing layers are disposed on a surface of the transparent substrate opposite to the surface close to the liquid crystal layer, the present invention is not limited to this. For example, the same advantages are obtained if the relationship between the positions and the optical axes (absorption axes and liquid crystal molecular long axis) of the respective polarizing layers and the liquid crystal layer satisfies the conditions shown in FIG. 1.

Figure 16:
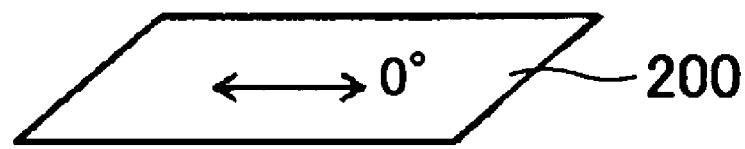
FIG. 16 is an illustrative diagram of a liquid crystal display device according to a second embodiment, showing an example of the relationship between the positions and the optical axes (absorption axes and liquid crystal molecular long axis) of the main parts thereof, which are a pair of O-type polarizing layers, a liquid crystal layer, and an E-type polarizing layer.
Figure 16:
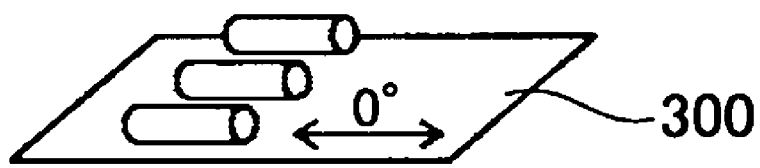
Figure 16:
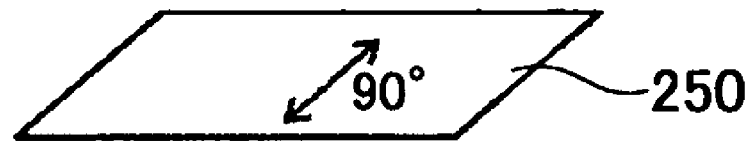
Figure 16:
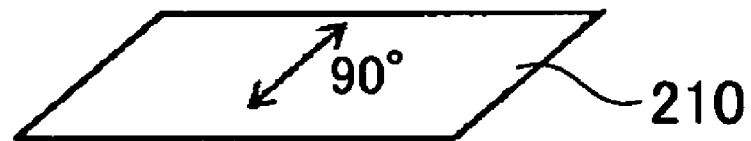

FIG. 16 is an illustrative diagram of another embodiment (second embodiment) of the liquid crystal display device according to the present invention, showing an example of the relationship between the positions and the optical axes (absorption axes and liquid crystal molecular long axis) of the main parts thereof, which are a pair of O-type polarizing layers, a liquid crystal layer, and an E-type polarizing layer. The liquid crystal display device shown in FIG. 16 is the same as the liquid crystal display device described with reference to FIG. 1, except that in the present embodiment, the third polarizing layer 250 which is disposed between the first polarizing layer 200 and the liquid crystal layer 300 in the first embodiment is disposed between the second polarizing layer 210 and the liquid crystal layer 300. Therefore, description of the same parts as those of the liquid crystal display device described with reference to FIG. 1 will be omitted.

In the liquid crystal display device of the second embodiment shown in FIG. 16, the absorption axis of the third polarizing layer 250 which is constructed by the E-type polarizing layer is parallel to the absorption axis of the adjacent second polarizing layer 210 and is at an angle of 90°. The slow axis of the liquid crystal layer 300 is orthogonal to the absorption axis of the third polarizing layer 250 and is at an angle of 0°. In this case, similarly to the above description, it is also possible to obtain the advantages that the light leakage in the oblique direction is suppressed and the contrast ratio is improved. That is, the light leakage occurring when a pair of O-type polarizing layers (200, 210) of which the absorption axes are orthogonal to each other when observed from the normal direction is observed from an oblique direction can be suppressed by using an E-type polarizing layer of which the extinction coefficients satisfy the same relation as the aforementioned of the third polarizing layer 250. In this case, since the slow axis of the liquid crystal layer 300 is orthogonal to the absorption axis of the third polarizing layer 250, it is possible to prevent the advantages from being degraded by the influence of birefringence of the liquid crystal layer 300.

The liquid crystal display device of the present embodiment includes a liquid crystal display panel. The liquid crystal display panel includes the first to third polarizing layers (200, 210, and 250) and the liquid crystal layer 300 shown in FIG. 16, and further includes first and second transparent substrates interposing the liquid crystal layer 300 therebetween, which are not shown in FIG. 16. In the present embodiment, the first polarizing layer 200 is disposed on a surface of the first transparent substrate opposite to the surface close to the liquid crystal layer (300), the second polarizing layer 210 is disposed on a surface (backlight-side surface) of the second transparent substrate opposite to the surface close to the liquid crystal layer 300, and the third polarizing layer 250 is disposed between the second transparent substrate and the second polarizing layer 210.

As described above, although it is practical that the respective polarizing layers are disposed on a surface of the transparent substrate opposite to the surface close to the liquid crystal layer, the present invention is not limited to this. For example, the same advantages are obtained if the relationship between the positions and the optical axes (absorption axes and liquid crystal molecular long axis) of the respective polarizing layers and the liquid crystal layer satisfies the conditions shown in FIG. 16.

Given the above, although the liquid crystal display devices of the first and second embodiments described with reference to FIGS. 1 and 16 have the same basic advantages, the condition that provides a higher effect may be selected in accordance with the purpose. Next, the relationship between the absorption axis of the third polarizing layer 250 and the viewing angle dependence of the contrast ratio will be described by way of the liquid crystal display device of the first embodiment.

Figure 17:
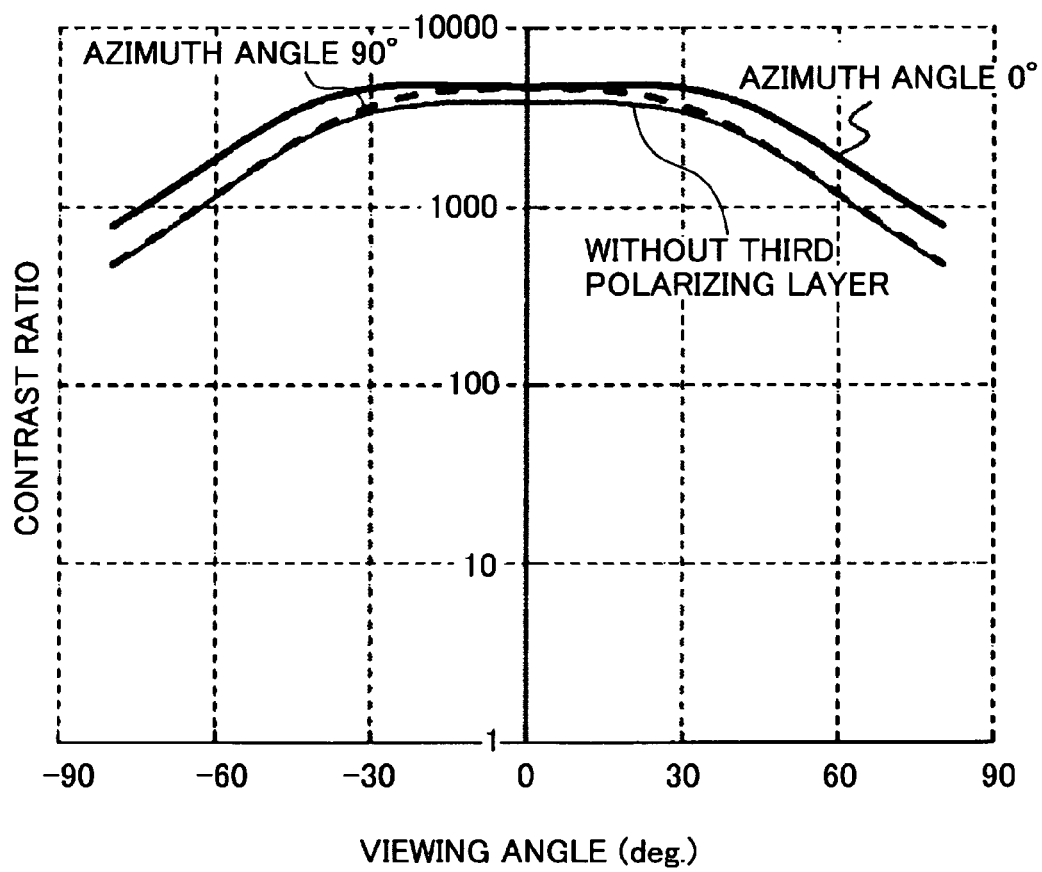
FIG. 17 is a diagram showing the viewing angle dependence of a contrast ratio of the liquid crystal display device of the first embodiment when the azimuth angle is 0° and 90°.

FIG. 17 is a diagram showing the viewing angle dependence of a contrast ratio of the liquid crystal display device of the first embodiment. Specifically, FIG. 17 shows the calculation results of the viewing angle dependence of the contrast ratio when the absorption axes of the first and third polarizing layers 200 and 250 are both at an angle of 0°, the absorption axis of the second polarizing layer 210 is at an angle of 90°, and the slow axis of the liquid crystal layer 300 is at an angle of 90°, namely for a case (bold solid line) where the azimuth angle is 0° and a case (broken line) where the azimuth angle is 90° in the first embodiment described with reference to FIG. 1. For comparison, FIG. 17 also shows the calculation results for a case (narrow solid line) where the third polarizing layer is not provided. It should be noted that the calculation results are obtained for a case where the extinction coefficients of the third polarizing layer 250 satisfy the relation of kx/kz=1.0, namely kx=kz, and kx/ky=10.

As shown in the figure, a higher contrast ratio is obtained in the oblique direction when the azimuth angle is 0° than when the azimuth angle is 90°. That is, in directions parallel to the absorption axis of the third polarizing layer 250, a wider viewing angle is obtained than directions orthogonal to the absorption axis of the third polarizing layer 250. Therefore, for the purpose of being used in on-vehicle display devices and televisions in which a wide viewing angle is required particularly in the horizontal direction (left-right direction), a structure in which the absorption axis of the third polarizing layer 250 is parallel to the horizontal direction of the screen is desirable. That is, it may be helpful to select a structure in which the absorption axis of the third polarizing layer 250 is parallel to directions where a wider viewing angle is obtained.

Figure 18:
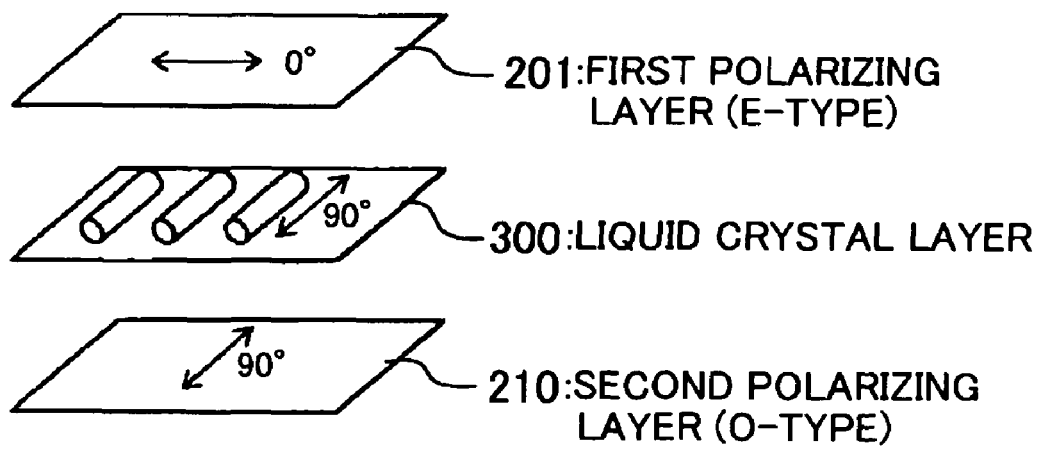
FIG. 18 is an illustrative diagram of a liquid crystal display device according to a third embodiment, showing an example of the relationship between the positions and the optical axes (absorption axes and liquid crystal molecular long axis) of the main parts thereof, which are an O-type polarizing layer, a liquid crystal layer, and an E-type polarizing layer.

Next, another embodiment of the liquid crystal display device according to the present invention will be described. FIG. 18 is an illustrative diagram of another embodiment (third embodiment) of the liquid crystal display device according to the present invention, showing an example of the relationship between the positions and the optical axes (absorption axes and liquid crystal molecular long axis) of the main parts thereof, which are an O-type polarizing layer, a liquid crystal layer, and an E-type polarizing layer. The liquid crystal display device shown in FIG. 18 is the same as the liquid crystal display device of the first embodiment described with reference to FIG. 1, except that in the present embodiment, the first polarizing layer is changed to an E-type polarizing layer, and the third polarizing layer is removed. Therefore, the same parts as those of the liquid crystal display device of the first embodiment described with reference to FIG. 1 will be denoted by the same reference numerals and description thereof will be omitted.

In other words, the liquid crystal display device of the third embodiment shown in FIG. 18 is different from the liquid crystal display device described with reference to FIG. 1, in that the first polarizing layer 200 is removed, and the third polarizing layer 250 is read as the first polarizing layer 201. Therefore, the absorption axis of the first polarizing layer 201 constructed by an E-type polarizing layer is at an angle of 0°, the slow axis of the liquid crystal layer 300 and the absorption axis of the second polarizing layer 210 are orthogonal to the absorption axis of the first polarizing layer 201 which is an E-type polarizing layer and are at an angle of 90°. In this case, similarly to the above description, it is also possible to obtain the advantages that the light leakage in the oblique direction is suppressed and the contrast ratio is improved. That is, the light leakage occurring when a pair of O-type polarizing layers, of which the absorption axes are orthogonal to each other when observed from the normal direction, is observed from an oblique direction can be suppressed by changing any one of the polarizing layers to the E-type polarizing layer, namely by substituting the first polarizing layer 201 with an E-type polarizing layer of which the extinction coefficients satisfy the same relation as the third polarizing layer 250. In this case, since the slow axis of the liquid crystal layer 300 is orthogonal to the absorption axis of the first polarizing layer 201 which is an E-type polarizing layer, it is possible to prevent the advantages from being degraded by the influence of birefringence of the liquid crystal layer 300. The reasons for this are the same as those in the liquid crystal display device described with reference to FIG. 1.

The liquid crystal display device of the third embodiment includes a liquid crystal display panel. The liquid crystal display panel includes the first and second polarizing layers (201, 210) and the liquid crystal layer 300 shown in FIG. 18, and further includes first and second transparent substrates interposing the liquid crystal layer 300 therebetween, which are not shown in FIG. 18. In the third embodiment, the first polarizing layer 201 is disposed on a surface of the first transparent substrate opposite to the surface close to the liquid crystal layer 300, and the second polarizing layer 210 is disposed on a surface (backlight-side surface) of the second transparent substrate opposite to the surface close to the liquid crystal layer 300.

As described above, although it is practical that the respective polarizing layers are disposed on a surface of the transparent substrate opposite to the surface close to the liquid crystal layer, the present invention is not limited to this. For example, the same advantages are obtained if the relationship between the positions and the optical axes (absorption axes and liquid crystal molecular long axis) of the respective polarizing layers and the liquid crystal layer satisfies the conditions shown in FIG. 18.

Figure 19:
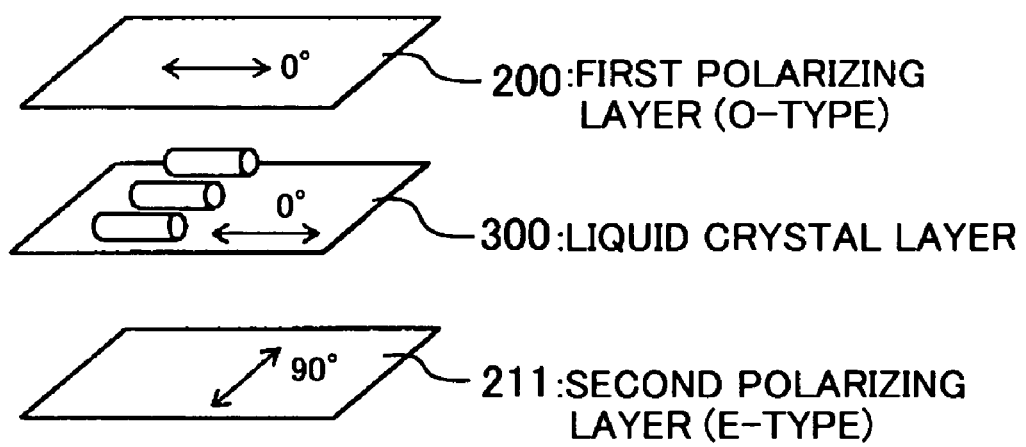
FIG. 19 is an illustrative diagram of a liquid crystal display device according to a fourth embodiment, showing an example of the relationship between the positions and the optical axes (absorption axes and liquid crystal molecular long axis) of the main parts thereof, which are an O-type polarizing layer, a liquid crystal layer, and an E-type polarizing layer.

Next, another embodiment of the liquid crystal display device according to the present invention will be described. FIG. 19 is an illustrative diagram of another embodiment (fourth embodiment) of the liquid crystal display device according to the present invention, showing an example of the relationship between the positions and the optical axes (absorption axes and liquid crystal molecular long axis) of the main parts thereof, which are an O-type polarizing layer, a liquid crystal layer, and an E-type polarizing layer. The liquid crystal display device shown in FIG. 19 is the same as the liquid crystal display device of the second embodiment described with reference to FIG. 16, except that in the present embodiment, the second polarizing layer is changed to an E-type polarizing layer, and the third polarizing layer is removed. Therefore, the same parts as those of the liquid crystal display device of the second embodiment described with reference to FIG. 16 will be denoted by the same reference numerals and description thereof will be omitted.

In other words, the liquid crystal display device of the fourth embodiment shown in FIG. 19 is different from the liquid crystal display device of the second embodiment described with reference to FIG. 16, in that the second polarizing layer 210 is removed, and the third polarizing layer 250 is read as the second polarizing layer 211. Therefore, the absorption axis of the second polarizing layer 211 constructed by an E-type polarizing layer is at an angle of 90°, the slow axis of the liquid crystal layer 300 and the absorption axis of the first polarizing layer 200 are orthogonal to the absorption axis of the second polarizing layer 211 which is an E-type polarizing layer and are at an angle of 0°. In this case, similarly to the above description, it is also possible to obtain the advantages that the light leakage in the oblique direction is suppressed and the contrast ratio is improved. That is, the light leakage occurring when a pair of O-type polarizing layers of which the absorption axes are orthogonal to each other when observed from the normal direction is observed from an oblique direction can be suppressed by changing any one of the polarizing layers to the E-type polarizing layer, namely by substituting the second polarizing layer 211 with an E-type polarizing layer of which the extinction coefficients satisfy the same relation as the third polarizing layer 250. In this case, since the slow axis of the liquid crystal layer 300 is orthogonal to the absorption axis of the second polarizing layer 211 which is an E-type polarizing layer, it is possible to prevent the advantages from being degraded by the influence of birefringence of the liquid crystal layer 300. The reasons for this are the same as those in the liquid crystal display devices described with reference to FIGS. 1 and 16.

The liquid crystal display device of the present embodiment includes a liquid crystal display panel. The liquid crystal display panel includes the first and second polarizing layers (200, 211) and the liquid crystal layer 300 shown in FIG. 19, and further includes first and second transparent substrates interposing the liquid crystal layer 300 therebetween, which are not shown in FIG. 19. In the present embodiment, the first polarizing layer 200 is disposed on a surface of the first transparent substrate opposite to the surface close to the liquid crystal layer 300, and the second polarizing layer 211 is disposed on a surface (backlight-side surface) of the second transparent substrate opposite to the surface close to the liquid crystal layer 300.

As described above, although it is practical that the respective polarizing layers are disposed on a surface of the transparent substrate opposite to the surface close to the liquid crystal layer, the present invention is not limited to this. For example, the same advantages are obtained if the relationship between the positions and the optical axes (absorption axes and liquid crystal molecular long axis) of the respective polarizing layers and the liquid crystal layer satisfies the conditions shown in FIG. 19.

Table 1 shows the relationship between a combination and a viewing angle widening effect when an E-type polarizing layer is used in a liquid crystal display device in which the liquid crystal layer has an optically uniaxial anisotropy during the black display like the IPS-mode liquid crystal display device. As described above, when an E-type polarizing layer is disposed on any one of the observer side and the backlight side of the liquid crystal layer, and the slow axis of the liquid crystal layer is orthogonal to the absorption axis of the E-type polarizing layer when observed from the normal direction, the light leakage in the oblique direction is suppressed and the contrast ratio is improved, whereby a wide viewing angle is obtained.

TABLE 1

| Viewing angle widening effect | Poor | Good | Good | Poor | Poor | Good | Good | Poor |
|---|---|---|---|---|---|---|---|---|
| Absorption axis of observer-side polarizing layer is at 0° | O-type E-type | O-type E-type | O-type — | O-type — | — E-type | — E-type | O-type — | O-type — |

TABLE 1-continued

| | | | | | | | | |
|---|---|---|---|---|---|---|---|---|
| Slow axis of liquid crystal layer | 0° | 90° | 0° | 90° | 0° | 90° | 0° | 90° |
| Absorption axis of backlight-side polarizing layer is at 90° | O-type | O-type | E-type O-type | E-type O-type | O-type | O-type | E-type | E-type |
| Remarks | | | FIG. 1 | FIG. 16 | | | FIG. 18 | FIG. 19 |

Although in any of the cases described above, it has been described that the absorption axis of a polarizing layer disposed closer to the observer side is at an angle of 0°, that is, on the horizontal direction (left-right direction), the present invention is not limited to this. That is, it is obvious that the advantages of the present invention of the light leakage in the oblique direction being suppressed and the contrast ratio being improved are obtained even under conditions other than the above-described conditions if the relative relationship between the absorption axes of the O-type polarizing layer and the E-type polarizing layer and the slow axis of the liquid crystal layer is the same.

Although the present invention will be described by way of examples with reference to the drawings, it should be noted that various changes and modifications can be made, and combinations of the above embodiments and the examples below are also included in the present invention.

Example 1

Figure 20:
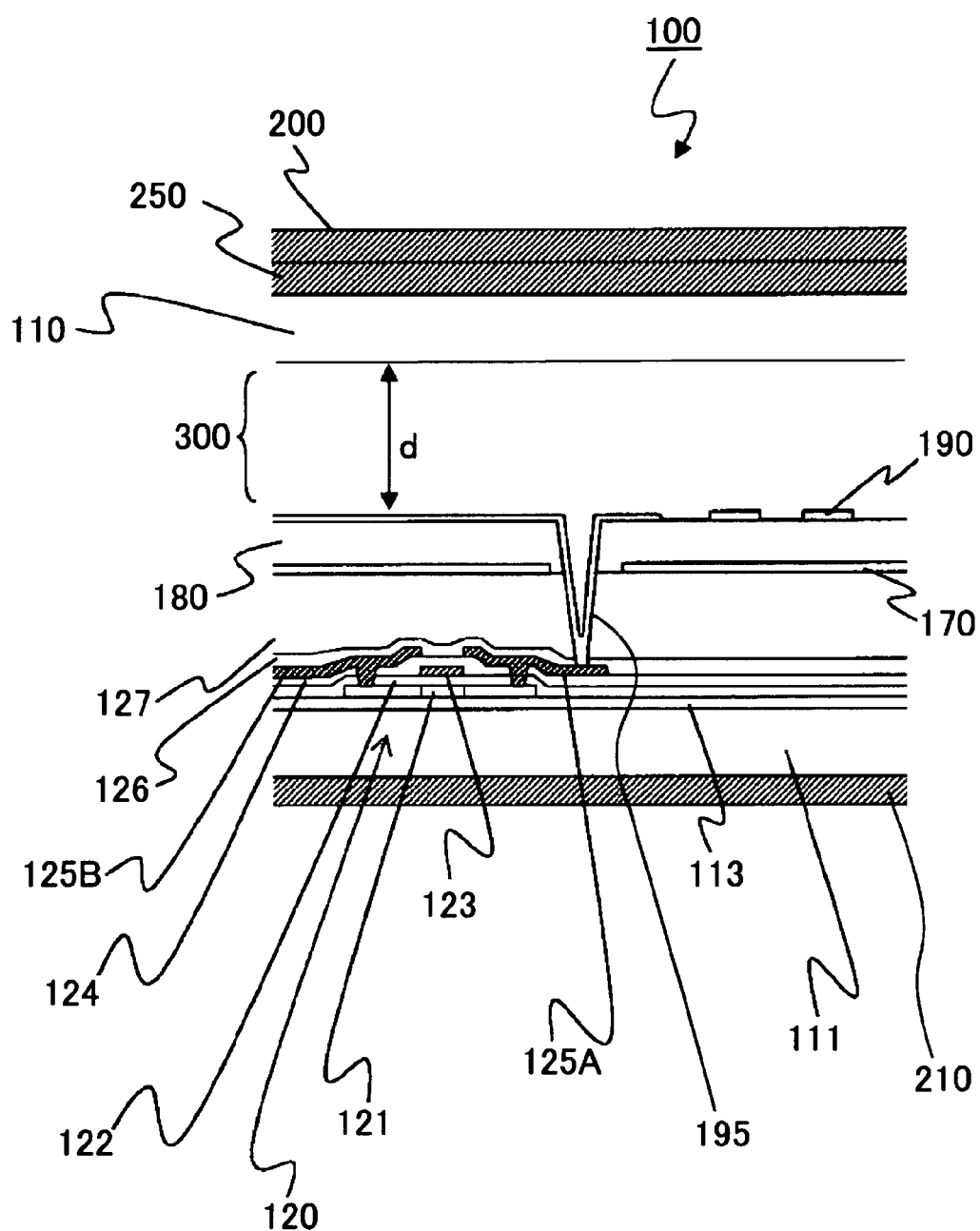
FIG. 20 is a sectional diagram showing a schematic configuration of the main parts of a pixel of a liquid crystal display panel of a liquid crystal display device of Example 1.
Figure 21:
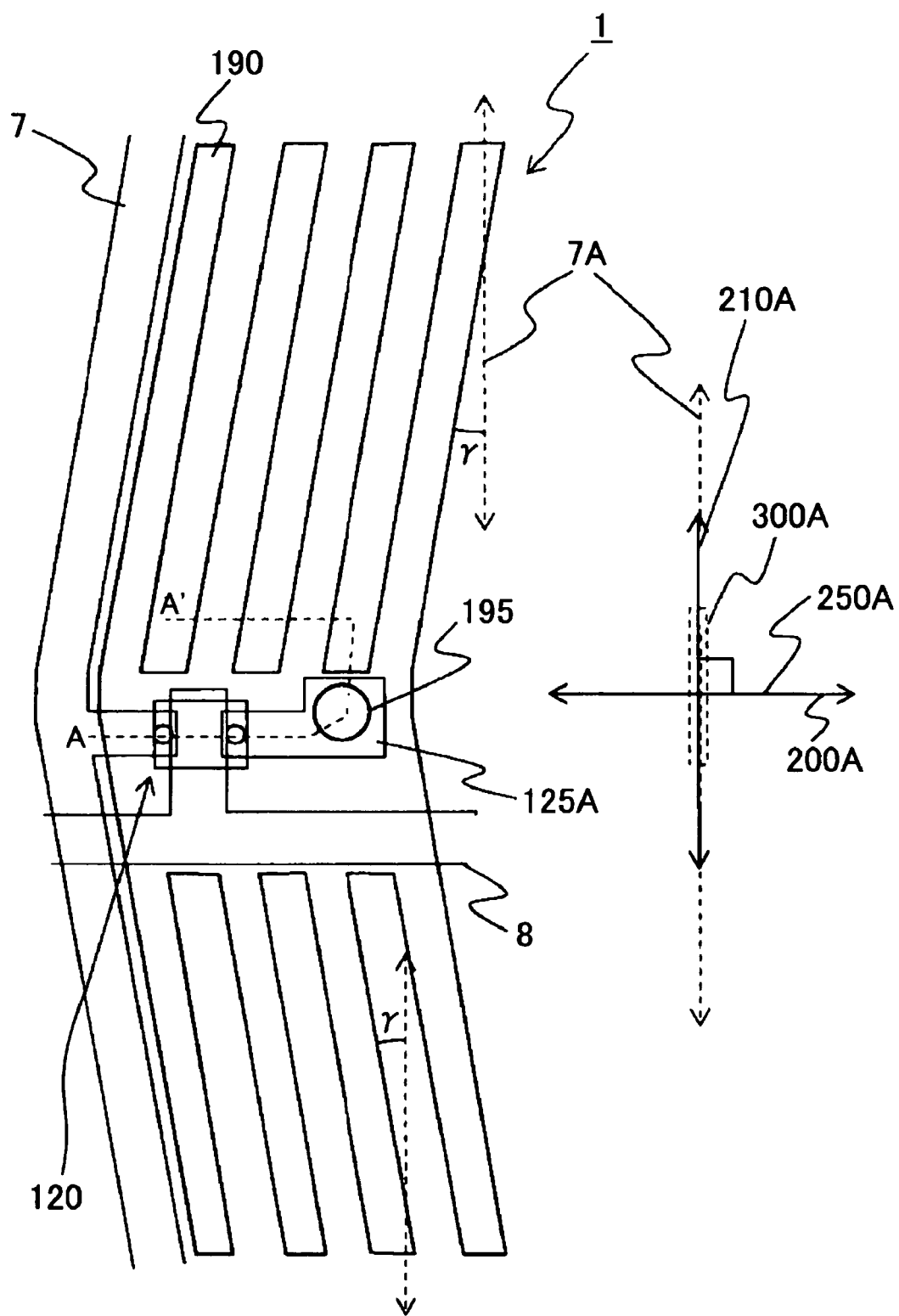
FIG. 21 is a top view showing a schematic configuration of the main parts of the pixel of the liquid crystal display panel of the liquid crystal display device of Example 1.

FIG. 20 is a sectional diagram showing a schematic configuration of the main parts of a pixel 1 of a liquid crystal display panel of a liquid crystal display device of Example 1. In addition, FIG. 21 is a top view showing a schematic configuration of the main parts of the pixel 1 of the liquid crystal display panel of the liquid crystal display device of Example 1. Here, FIG. 20 schematically shows a sectional structure along the line A-A' in FIG. 21. In addition, FIG. 22 is a block diagram schematically showing an example of an overall layout of the liquid crystal display panel 100 of the liquid crystal display device of Example 1.

Figure 22:
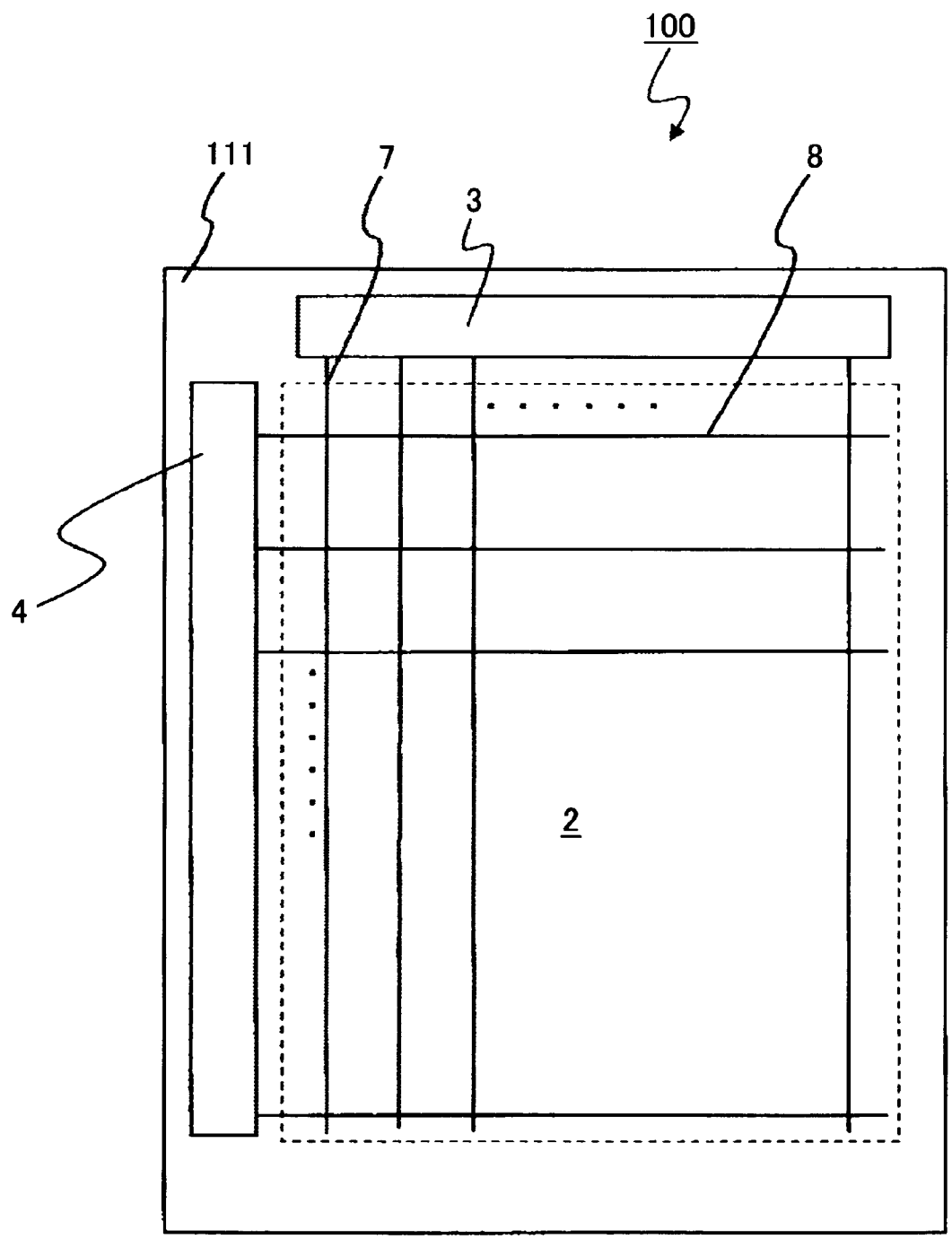
FIG. 22 is a block diagram schematically showing an example of an overall layout of the liquid crystal display panel of the liquid crystal display device of Example 1.

The liquid crystal display device of Example 1 includes the liquid crystal display panel 100 shown in FIG. 22. As shown in FIG. 22, the liquid crystal display panel 100 has a display area 2 which is provided in a region including the central portion of a second transparent substrate 111. In FIG. 22, a data driver circuit 3 that outputs image signals to data lines (signal lines) 7 is provided on the upper side of the display area 2, and a scan driver circuit 4 that outputs scan signals to gate lines (scanning lines) 8 is provided on the left side thereof. These driver circuits 3 and 4 are constructed by shift register circuits, level-shift circuits, analog switch circuits, and the like, which are constructed by complementary circuits using N-channel and P-channel type thin-film transistors (TFTs). Similar to an active matrix drive-type liquid crystal display panel of the related art, the liquid crystal display panel 100 has plural gate lines 8, plural data lines 7 extending in a direction such as to intersect the extending direction of the gate lines 8, and sub-pixels arranged in a matrix form at the intersections of the gate lines 8 and the data lines 7.

Although the smallest units that display characters and graphics are generally called dots, in this specification, this smallest unit dot will be referred to as a pixel. In color display systems, since pixels are generally divided into the three colors red (R), green (G), and blue (B), the pixels of three colors R, G, and B are collectively referred to as a pixel. Moreover, although ⅓ of the dots divided by the three colors R, G, and B is generally referred to as a sub-pixel, in this specification, ⅓ of the dots divided by the three colors R, G, and B will also be referred to as simply a pixel.

As shown in FIG. 20, the liquid crystal display panel 100 of Example 1 includes first and second transparent substrates 110 and 111, which are formed from transparent media that have electrical insulation and are flat, transparent, and optically isotropic, and a liquid crystal layer 300 interposed between these substrates. As the first and second transparent substrates 110 and 111, glass is generally used, and a polymer film that meets the above-mentioned requirements and have improved heat resistance and durability can be used.

The first transparent substrate 110 has color filters and an alignment layer (neither of them are shown) which are stacked on a surface thereof close to the liquid crystal layer 300. The color filters are used for allowing light of desired colors to pass through corresponding sub-pixels. In this case, the desired colors are the colors associated with the individual pixels, and may be for example, the three primary colors in the additive color mixing model, which are red, green, and blue, the three primary colors in the subtractive color mixing model, which are yellow, magenta, and cyan, or bluish green and yellowish green.

The second transparent substrate 111 has a switching element 120 which is provided on a surface thereof close to the liquid crystal layer 300. The switching element 120 is constructed by a thin-film transistor that has a semiconductor layer formed from polysilicon, amorphous silicon, or organic matter. Although in this example, the case where the switching element 120 is constructed by a thin-film transistor formed from polysilicon is described as an example, the present invention is not limited to this. The switching element 120 constructed by a polysilicon thin-film transistor has a gate insulator layer 122, a gate electrode 123, a first interlayer insulation layer 124, an electrode layer 125A, an electrode layer 125B, and a second interlayer insulation layer 126 which are provided on a polysilicon layer that includes a semiconductor layer 121, which becomes a source/drain region and a channel region, or the like.

The gate insulator layer 122 and the first interlayer insulation layer 124 are formed from, for example, SiOx (silicon oxide), and the second interlayer insulation layer 126 is formed from, for example, SiNx (silicon nitride).

As the electrode layers 125A and 125B, metallic electrode materials may be used. For example, although a three-layer laminate film in which an aluminum layer is sandwiched by titanium (Ti), tungsten (W), and the like can be used, the present invention is not limited to this. The electrode layers 125A and 125B are electrically connected to the source and drain regions of the semiconductor layer 121 through an opening formed on the first interlayer insulation layer 124.

It should be noted that a foundation layer 113 may be provided between the switching element 120 and the second transparent substrate 111 in order to block penetration of ions of Na, K, and other elements from the transparent substrate 111 into the semiconductor layer 121 and the gate insulator layer 122. The foundation layer 113 has a stacked structure in which a SiNx layer and a SiOx layer are stacked in that order from the transparent substrate 111 side.

An insulating layer 127 is provided on the switching element 120. The insulating layer 127 has a function of planarizing steps resulting from the switching element 120, wirings, and the like in addition to the insulating function. In order to planarize the steps, it is desirable to use materials which can be formed in a solution state. Therefore, as the insulating layer 127, organic materials, or inorganic materials which are dispersed in a solvent so as to be coated and deposited can be used. For the insulating layer 127 to effectively pass light from a backlight therethrough, transparent materials exhibiting small absorption to visible light are desirable. Therefore, as the insulating layer 127, organic materials such as photosensitive polyimide or acrylic resin are desirable.

A common electrode 170 is formed on the insulating layer 127. The common electrode 170 is formed from transparent conductive materials. As the common electrode 170, for example, indium tin oxides (ITO) are preferred, and other transparent conductive materials such as InZnO can be used.

An insulating layer 180 is formed on the common electrode 170, and a pixel electrode 190 is formed thereon. As the insulating layer 180, insulating materials which are transparent to visible light are desirable, and transparent resin materials such as polyimide resin or acrylic resin, or transparent inorganic materials such as SiOx (silicon oxide) or SiNx (silicon nitride) can be used.

The pixel electrode 190 is desirably formed from transparent conductive materials, and similarly to the common electrode 170, indium tin oxides (ITO) are preferred, and other transparent conductive materials such as InZnO can be used. In addition, the pixel electrode 190 is electrically connected to the electrode layer 125A that forms the switching element 120 via an opening (through-hole) 195 that penetrates through the insulating layer 180, the common electrode 170, and the insulating layers 127 and 126. The through-hole 195 may be directly filled with the same conductive materials as the pixel electrode 190, and alternatively, an intermediate layer (not shown) may be provided in order to enhance contact of the electrode materials that constitute the electrode layer 125A and the pixel electrode 190.

It should be noted that the common electrode 170 is perfectly isolated by an insulating layer via an opening which is formed in a portion of the through-hole 195 and which has a sufficient size such as to prevent contact with the pixel electrode 190.

The pixel electrode 190 has an interdigital shape as shown in FIG. 21. Moreover, although the electrode layer 125B is connected to the data lines 7 and the gate electrode 123 is connected to the gate lines 8, the electrode layer 125B may be pulled out from the data lines 7, and the gate electrode 123 may be pulled out from the gate lines 8.

An alignment layer (not shown) is formed so as to cover the insulating layer 180 and the pixel electrode 190. As the alignment layer, similarly to the alignment layer formed on the first transparent substrate 110, polyimide-series polymers, diamond-like carbons, and the like are used.

The first and second transparent substrates 110 and 111 are attached at their peripheries by a frame-shaped sealing agent in a state where the alignment layer formed surfaces thereof face each other and a predetermined gap is formed by a spacer (not shown), whereby a space is formed therebetween. In this space, nematic liquid crystals having a positive dielectric anisotropy are filled and sealed, whereby a liquid crystal layer 300 is formed. In the liquid crystal layer 300, the alignment direction of the liquid crystal molecular long axis thereof is defined by the rubbing performed on the alignment layers formed on the first and second transparent substrates 110 and 111. The liquid crystal alignment direction of the liquid crystal layer 300 is in a so-called homogeneous alignment state where it is not twisted between the two transparent substrates 110 and 111.

The thickness d of the liquid crystal layer 300 may be selected so as to satisfy a relation of $\Delta nd=(1/2)\times\lambda$ where $\Delta n$ is the anisotropy of refractive index of liquid crystal materials, $\Delta nd$ is a retardation, and $\lambda$ is a wavelength. That is, for light having a wavelength of 550 nm, the thickness d may be selected so as to satisfy a relation of $\Delta nd=275$ [nm]. However, in an actual liquid crystal display panel, the alignment state of the liquid crystal molecules does not change uniformly when a voltage is applied to a liquid crystal layer. Therefore, in order to realize brighter display, since the retardation $\Delta nd$ of the liquid crystal layer 300 is slightly greater than $(1/2)\times\lambda$, the thickness d may be appropriately selected within the range of $275\text{ nm}\leqq\Delta nd\leqq 400\text{ nm}$ for light having a wavelength of 550 nm, for example.

First and second polarizing layers 200 and 210 are disposed on surfaces of the first and second transparent substrates 110 and 111 opposite to the surfaces close to the liquid crystal layer 300, respectively.

The first and second polarizing layers 200 and 210 are O-type polarizing layers, and can be obtained by forming a protection layer formed from triacetylcellulose on both surfaces of a film which is provided with a polarizing function by adsorbing iodine to stretched polyvinyl alcohol.

A third polarizing layer 250 is formed between the first polarizing layer 200 and the first transparent substrate 110.

The third polarizing layer 250 is an E-type polarizing layer. The third polarizing layer 250 can be realized, for example, by coating and forming lyotropic liquid crystals formed from dichroic dye on the first polarizing layer or the first transparent substrate. Such lyotropic liquid crystals are disclosed, for example, in JP-T-2006-518871, JP-A-2006-285219, and Journal of the Japanese Liquid Crystal Society, Vol. 11, No. 1, 2007, p 37-45. For example, when lyotropic liquid crystals formed from dichroic dye are used as the materials of the third polarizing layer, a coating machine capable of coating a film while applying stress to the film may be useful. For example, a slit die coater is capable of supplying a polarizing layer material in the solution state to a coating surface and stretching a film along the coating direction while applying shear stress to the material. By this process, dye molecules are oriented and fixed, whereby an E-type polarizing layer can be formed. In this case, the absorption axis of the polarizing layer is orthogonal to the coating direction.

In order to enhance orientation of dye molecules on the coating surface of the polarizing layer, a foundation treatment may be performed using an alignment layer or the like. As the alignment layer, polyimide-series polymers, diamond-like carbons, or the like can be used. When the alignment layer is polyimide-series polymer, it may be helpful to perform rubbing or irradiate polarized ultraviolet light so that an alignment regulating force is generated in a desired direction. Moreover, materials which exhibit dichroic properties upon being irradiated with linearly polarized light may be used as the polarizing layer.

In the present invention, the materials and processes of the third polarizing layer 250 are not particularly limited. And in any method, it is desirable that the third polarizing layer 250 is an E-type polarizing layer of which the extinction coefficients satisfy the relation of $1.3\geqq kx/kz\geqq 0.5$ if $kx/ky\geqq 5$, and the relation of $kx/kz\leqq 2.0$ if $kx/ky\geqq 10$ as described in the above description.

In addition, from the above-mentioned reasons, the third polarizing layer 250 is desirably an E-type polarizing layer in which the relation of $kx=kz>ky$ is satisfied.

When the third polarizing layer 250 is formed on the first polarizing layer 200, the third polarizing layer 250 and the first transparent substrate 110 are attached using a transparent adhesive agent. Alternatively, when the third polarizing layer 250 is formed on the first transparent substrate 110, the first polarizing layer 200 and the third polarizing layer 250 are attached using a transparent adhesive agent. In addition, the second polarizing layer 210 is attached to the second transparent substrate 111 by a transparent adhesive agent.

FIG. 21 also shows an illustrative diagram showing an example of the relationship viewed from the normal direction among an absorption axis 200A of the linearly polarized light in the first polarizing layer 200, an absorption axis 210A of the linearly polarized light in the second polarizing layer 210, an absorption axis 250A of the third polarizing layer 250, the direction (liquid crystal alignment direction) 300A of the liquid crystal molecular long axis of the liquid crystal layer 300, and the extending direction 7A of the data lines 7. That is, in this liquid crystal display device, the absorption axes (200A, 210A) of the first polarizing layer (O-type, 200) and the second polarizing layer (O-type, 210) are orthogonal to each other, the absorption axis 250A of the third polarizing layer (E-type, 250) is parallel to the absorption axis 200A of the first polarizing layer (O-type, 200), and the slow axis (the direction of liquid crystal molecular long axis, namely liquid crystal alignment direction 300A) of the liquid crystal layer 300 is orthogonal to the absorption axis 250A of the third polarizing layer (E-type, 250).

In the liquid crystal display device of this example, the linear parts of the interdigital pixel electrode 190 are tilted with respect to the extending direction 7A of the data lines 7. Specifically, the linear parts are tilted at the same angle γ but in different rotation directions between the upper and lower portions of a pixel. A bent angle of the pixel electrode 190 with respect to the extending direction 7A of the data lines 7, namely the tilt angle γ of the pixel electrode 190 (the linear parts) with respect to the liquid crystal alignment direction 300A is set to be in the range of 5° to 30°. However, when the alignment stability of the liquid crystal molecules and the display luminance are taken into consideration, the angle γ is desirably selected from the range of 7° to 15°.

Moreover, in order to reduce non-effective areas, as shown in the figure, it is desirable to bend the data lines 7 at the angle γ similar to the pixel electrode so as to comply with the bent shape of the pixel electrode.

In this example, the direction of the absorption axis 250A of the third polarizing layer 250 is orthogonal to the extending direction 7A of the data lines 7. Therefore, when the third polarizing layer 250 is realized by coating lyotropic liquid crystals formed from dichroic dye while applying shear stress to the first transparent substrate 110, it may be helpful to make the coating direction be parallel to the extending direction of the data lines, namely be parallel to the sides of the first transparent substrate 110. In this case, by coating the third polarizing layer materials, for example, using a slit die coater or the like, there is an advantage in that non-effective areas on the substrate where the polarizing layer materials are not easily coated can be reduced. Moreover, when the first transparent substrate 110 is cut from one large-size mother substrate, it is possible to reduce non-effective areas on the mother substrate where polarizing layer materials are not easily coated. Therefore, there is an advantage in that material costs can be reduced since more number of the first transparent substrates can be effectively obtained from one mother substrate.

Figure 23:
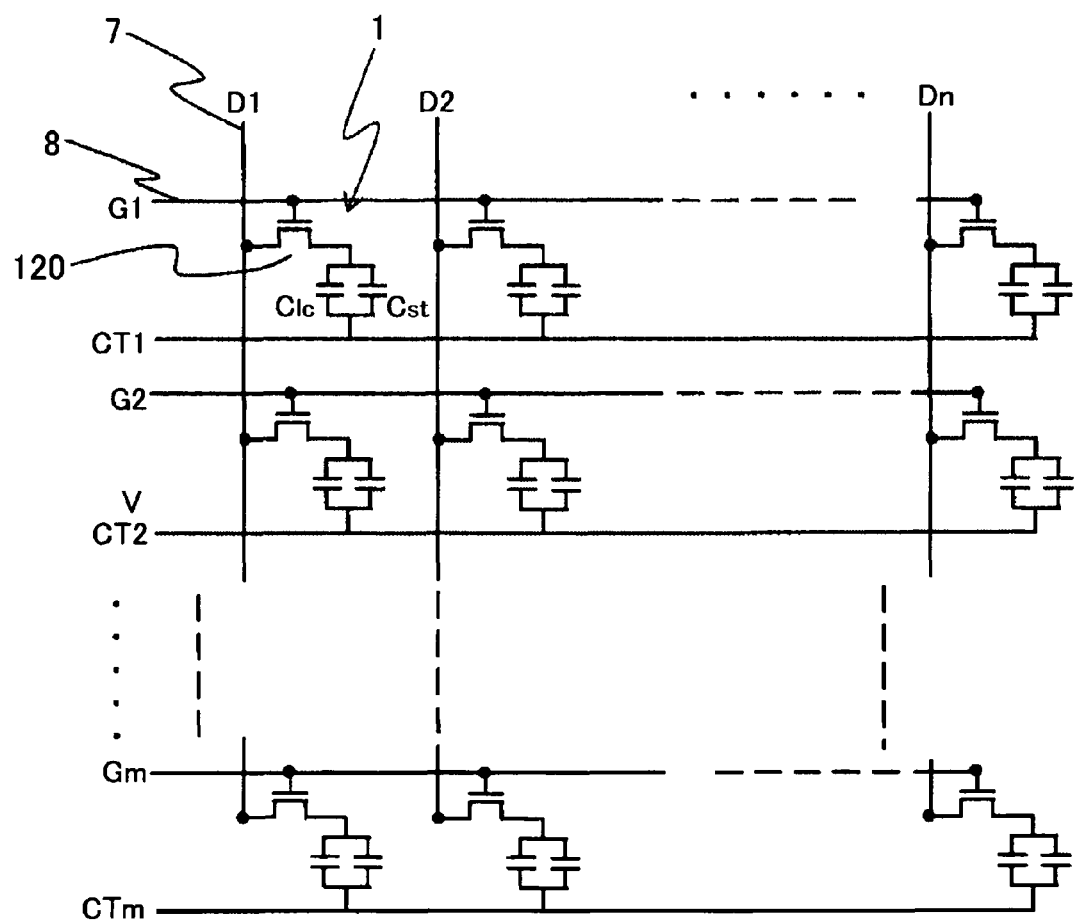
FIG. 23 is an equivalent circuit diagram of an active matrix constructed in a display area of the liquid crystal display panel of the liquid crystal display device of Example 1.

FIG. 23 is an equivalent circuit diagram of an active matrix constructed on the display area 2 of the liquid crystal display panel 100 of the liquid crystal display device of Example 1. Similar to an active matrix drive-type liquid crystal display panel of the related art, the liquid crystal display panel 100 has plural gate lines 8 and plural data lines 7 extending in a direction such as to intersect the extending direction of the gate lines 8. Moreover, as shown in FIG. 23, pixels 1 are arranged in a matrix form at the intersections of m gate lines G1, G2, . . . , Gm and n data lines D1, D2, . . . , Dn. In addition, common electrodes may be formed so as to extend in the same direction as the gate lines 8, and in FIG. 23, for convenience, m common electrodes CT1, CT2, . . . , CTm are illustrated. Alternatively, m common potential lines extending in the same direction as the gate lines 8 may be provided so as to be connected to the common electrodes formed in each pixel 1. Alternatively, the common electrodes may be formed so as to cover the entire display area excluding unnecessary portions such as through-holes. In any case, the common electrodes are connected so that they are controlled to be at a predetermined potential.

In an equivalent circuit diagram, each pixel 1 includes a pixel electrode, a common electrode, a capacitive element (storage capacitor) Cst formed by the insulating layer 180 interposed between the electrodes, a capacitive element Clc formed by the liquid crystal layer, and the switching element 120.

The pixels 1 are driven when a turn-on voltage is sequentially supplied from the gate line G1 on the first row, and the voltage (scanning signal) is sequentially supplied to the m gate line within one frame period. When the switching elements 120 are turned on by the scanning signals, a voltage corresponding to an image signal is supplied from the data lines 7 to the pixel electrodes via the switching elements 120. That is, during the period when the turn-on voltage is supplied to a certain gate line, all switching elements connected to that gate line are turned on, and a data voltage is supplied to n data lines in synchronization with this. That is, the driving method of the liquid crystal display panel 100 is the same as the active matrix drive-type IPS-mode liquid crystal display device of the related art, and detailed description thereof will be omitted.

Figure 24:
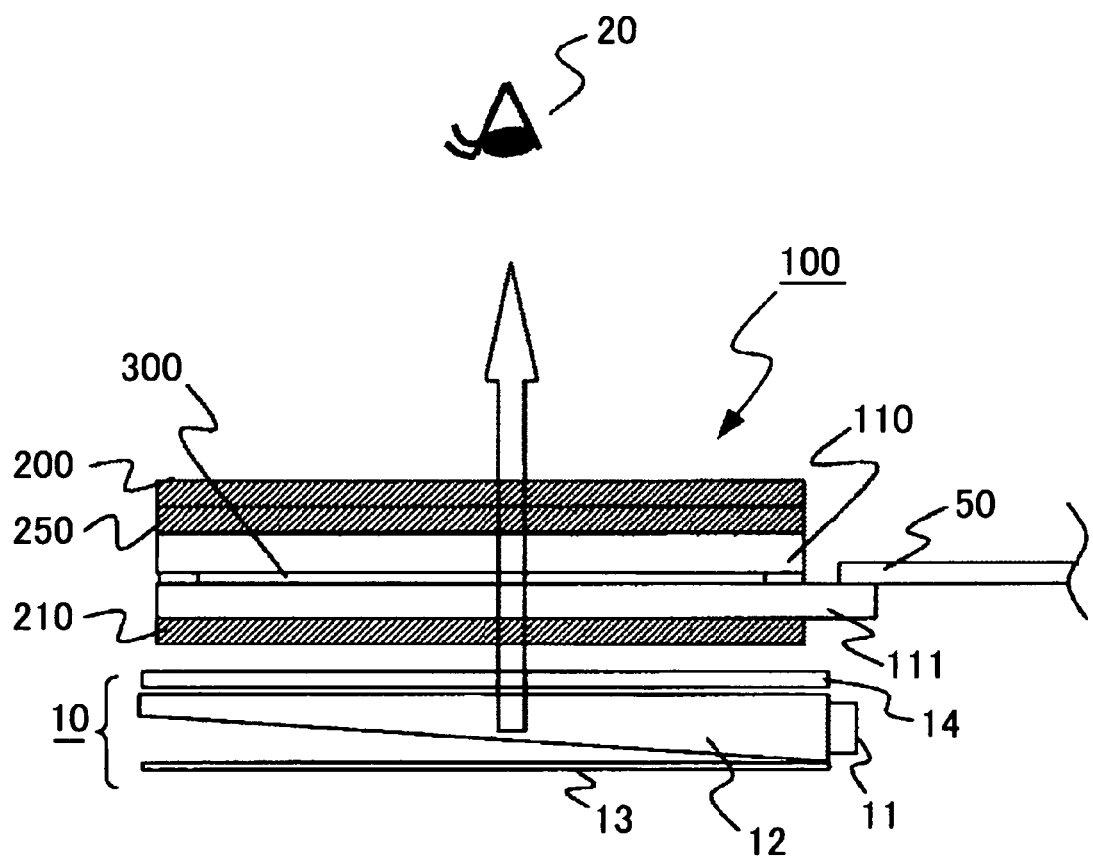
FIG. 24 is a schematic sectional diagram showing the configuration of the main parts of the liquid crystal display device of Example 1.

FIG. 24 is a schematic sectional diagram showing the configuration of the main parts of the liquid crystal display device of Example 1. This liquid crystal display device is constructed by the liquid crystal display panel 100 and a backlight 10 disposed on the back surface thereof. The liquid crystal display panel 100 includes the first and second transparent substrates 110 and 111 as described above.

The second transparent substrate 111 is generally larger than the first transparent substrate 110, and a region through which image information such as image signals is input from an external device as electrical signals is provided on a region of a surface of the second transparent substrate 111 close to the first transparent substrate 110 and not covered by the first transparent substrate 110. That is, the liquid crystal display panel 100 includes a flexible printed circuit (FPC) 50 on a region of the second transparent substrate 111, which does not overlap with the first transparent substrate 110. The liquid crystal display panel 100 is electrically connected to the external device via the FPC 50. Moreover, a semiconductor chip (not shown) functioning as a driver may be mounted on this region in accordance with a need.

The backlight 10 illuminates the display area 2 of the liquid crystal display panel 100 from the backside thereof. As the backlight 10, various types are known which include an edge light type (light guide plate type), a direct type (reflection plate type), and a planar light source type. As the backlight 10, an optimal type complying with the size of the display area may be selected from among these and other types in accordance with a use and a purpose. In this example, although an edge light type backlight is described, the present invention is not limited to this.

The backlight 10 includes a light guide plate 12 which is formed from a transparent resin and in which a means for changing the traveling direction of light such as a dot print of white pigment, a micro uneven shape, or a lens shape is formed on a rear surface thereof, a light source 11 disposed on an end surface of the light guide plate 12, a reflection sheet 13 disposed on a rear surface side of the light guide plate 12, and optical films 14, such as a prism sheet and a diffusion sheet, disposed on a top surface side of the light guide plate 12.

As the light source 11, a linear light source such as a cold cathode fluorescent tube or hot cathode fluorescent tube and a dot-shaped light source such as light-emitting diode (LED) can be used. In this example, although the case where LED is used as the light source 11 will be described, the present invention is not limited to this. When LED is used as the light source 11, since light from the light source can be effectively incident on the light guide plate 12, it may be helpful to provide a reflector (not shown) and form a mold resin at the periphery of the light-emitting portion of the LED.

In this configuration, light that is emitted from the light source 11 and incident on the light guide plate 12 propagate through the inside of the light guide plate 12 while experiencing total internal reflection. Among the rays of light propagating through the inside of the light guide plate 12, light arriving at the means for changing the light traveling direction, provided on the rear surface of the light guide plate 12 is output from the top surface side of the light guide plate 12 with its traveling direction changed. The light output from the light guide plate 12 is irradiated onto the liquid crystal display panel 100 with the output angle distribution and the in-plane luminance distribution being adjusted by the optical films 14 such as a prism sheet and a diffusion sheet.

The light that is emitted from the backlight 10 and irradiated onto the liquid crystal display panel 100 is incident on the third polarizing layer 250 after passing through the second polarizing layer 210 and the liquid crystal layer 300.

In this case, when a driving voltage corresponding to the image information transferred from an image information generation unit (not shown) is applied to the pixel electrode 190, a potential difference is generated between the pixel electrode 190 and the common electrode 170, and an electric field is formed, whereby the alignment direction of the liquid crystal molecules can be changed. By this action, the polarization state of light passing through the liquid crystal layer 300 is changed, and the amount of light passing through the third and first polarizing layers 250 and 210 can be controlled.

For example, when the driving voltage is 0 V, namely when there is no potential difference between the pixel electrode 190 and the common electrode 170, and no electric field is formed, the alignment direction of the liquid crystal molecules is not changed. Thus, the polarization state of light passing through the liquid crystal layer 300 is not changed. Therefore, the light passing through the liquid crystal layer 300 will be absorbed by the third and first polarizing layers 250 and 210, and will appear black (dark).

On the other hand, when a predetermined driving voltage is applied to the pixel electrode 190, and a predetermined electric field is formed between the pixel electrode 190 and the common electrode 170, the alignment direction of the liquid crystal is changed, and the polarization state of light passing through the liquid crystal layer 300 is changed. Therefore, the light passing through the liquid crystal layer 300 will pass through the third and first polarizing layers 250 and 210 in accordance with a change in the polarization state thereof and will appear bright with a predetermined luminance. That is, a so-called normally black-type display is performed in which the screen looks black (dark) when the driving voltage is zero and looks bright when a predetermined driving voltage is applied.

In the liquid crystal display device of this example, the third polarizing layer 250 is an E-type polarizing layer of which the extinction coefficients satisfy the above-mentioned requirements, and the absorption axis 250A of the third polarizing layer 250 is orthogonal to the slow axis of the liquid crystal layer 300 when observed from the normal direction. Therefore, as described above with reference to FIG. 1, since the light leakage in the oblique direction during the black display is reduced, a high contrast ratio is obtained. That is, a liquid crystal display device having a wide viewing angle can be realized.

Example 2

Figure 25:
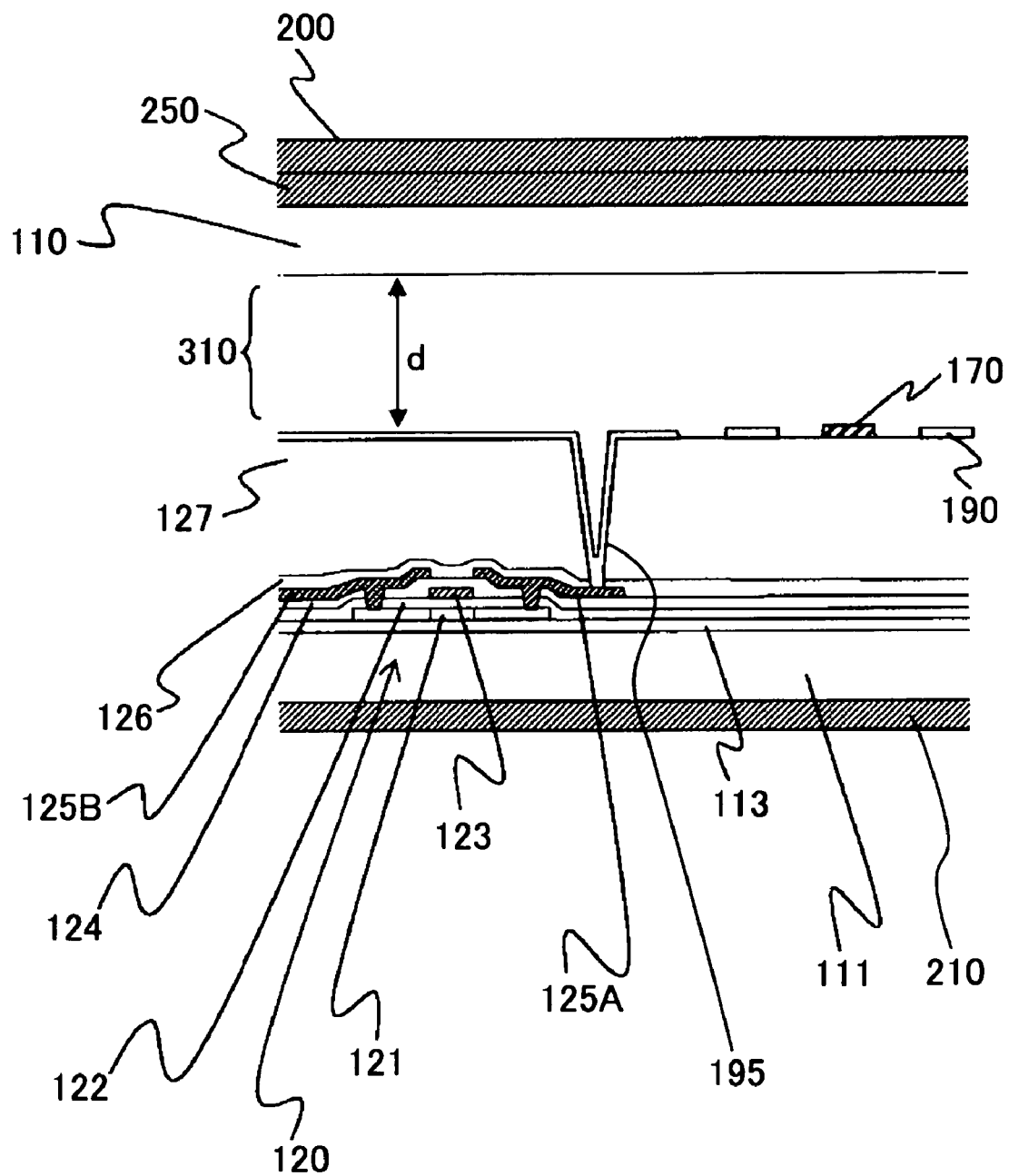
FIG. 25 is a sectional diagram showing the schematic configuration of the main parts of a pixel of a liquid crystal display panel that constructs a liquid crystal display device of Example 2.
Figure 26:
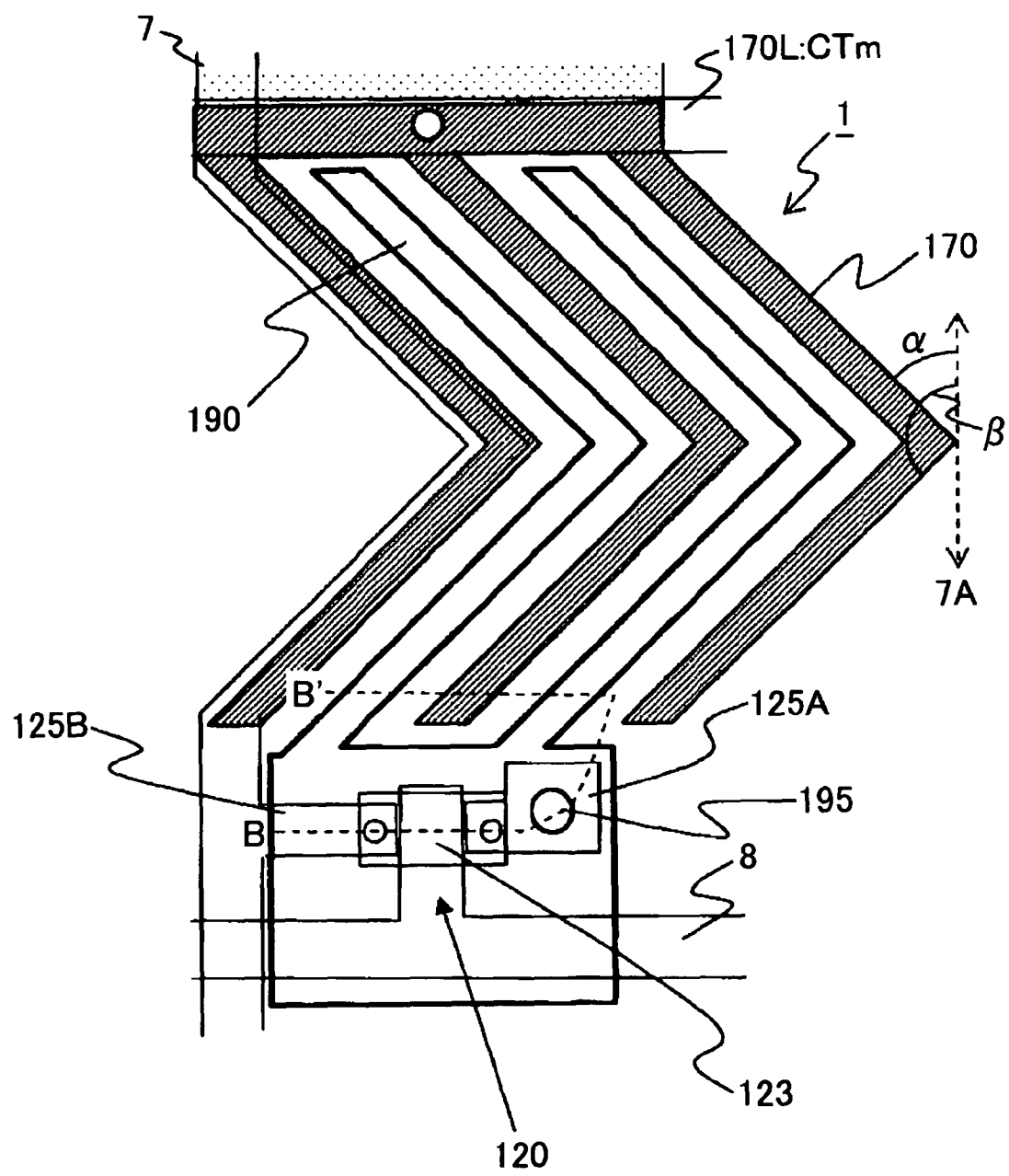
FIG. 26 is a top view showing the schematic configuration of the main part of the pixel of the liquid crystal display panel of Example 2.
Figure 27:
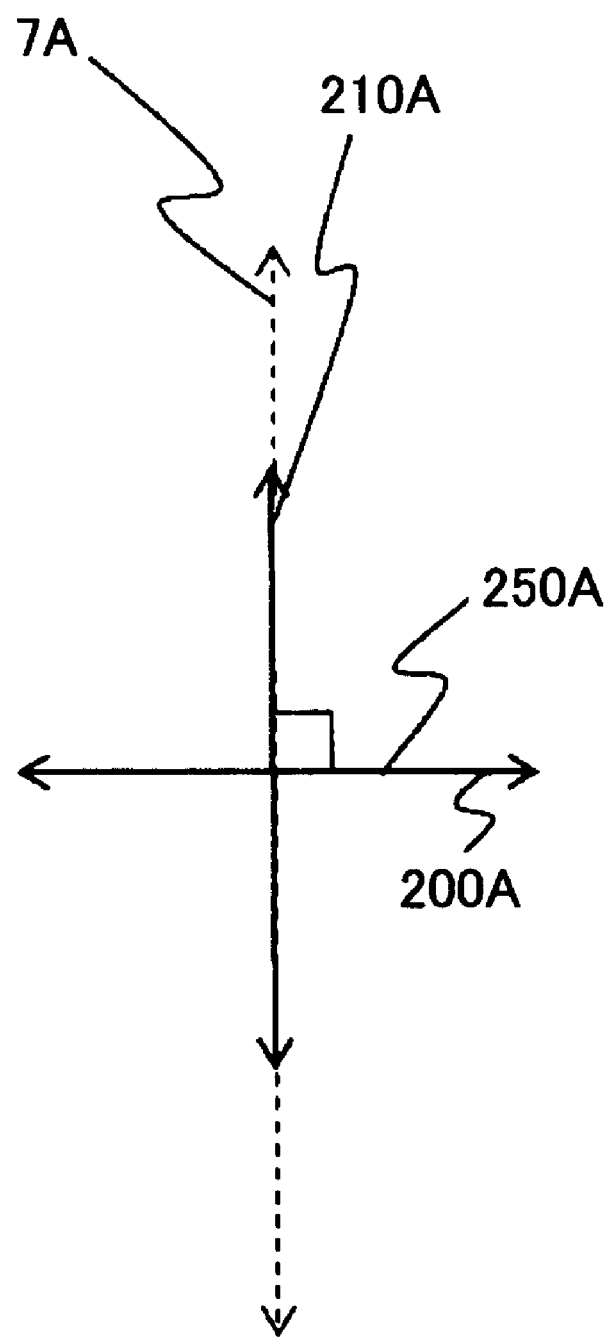
FIG. 27 is an illustrative diagram showing an example of the relationship between an absorption axis of a first polarizing layer, an absorption axis of a second polarizing layer, an absorption axis of a third polarizing layer, and an extending longitudinal direction of a data line when the liquid crystal display device of Example 2 is observed from a normal direction.

Next, another example of the present invention will be described. FIG. 25 is a sectional diagram showing a schematic configuration of the main parts of a pixel of a liquid crystal display panel that constructs a liquid crystal display device of Example 2. In addition, FIG. 26 is a top view showing a schematic configuration of the main parts of the pixel 1 of the liquid crystal display panel of Example 2. Here, FIG. 25 schematically shows a sectional structure along the line B-B' in FIG. 26. In addition, FIG. 27 is an illustrative diagram showing an example of the relationship between the absorption axis 200A of the first polarizing layer 200, the absorption axis 210A of the second polarizing layer 210, the absorption axis 250A of the third polarizing layer 250, and the extending direction 7A of the data lines 7 when this liquid crystal display device is observed from the normal direction. In this example, the absorption axes of the first and second polarizing layers are also orthogonal to each other, and the absorption axis of the third polarizing layer is also parallel to the absorption axis of the first polarizing layer.

The parts having the same functions as those of the liquid crystal display panel described in the above example will be denoted by the same reference numerals, and redundant description thereof will be omitted.

In this example, as shown in FIG. 25, the common electrode 170 and the pixel electrode 190 are formed on the same layer. Therefore, the insulating layer 180 in Example 1 described above is not necessary. In addition, the common electrode 170 and the pixel electrode 190 both have an interdigital shape and are disposed so as to alternate each other. Moreover, isotropic liquid crystals are used as the liquid crystal layer 310.

The first and second transparent substrates 110 and 111 are attached at their peripheries by a frame-shaped sealing agent in a state where a predetermined gap is formed by a spacer (not shown), whereby a space is formed therebetween. In this space, isotropic liquid crystals are filled, whereby a liquid crystal layer 310 is formed. The liquid crystal materials that constitute the liquid crystal layer 310 will be described later. Moreover, although 2-dimensional isotropic liquid crystals having bent core molecules are vertically aligned with respect to the substrate in its initial alignment state, since 3-dimensional isotropic liquid crystals do not have an initial alignment state, it is not necessary to dispose an alignment layer on both surfaces of the liquid crystal layer. When an alignment layer is necessary, polyimide-series polymers can be used as the alignment layer.

The thickness d of the liquid crystal layer 310 is determined by birefringence that is induced when an electric field is applied to the liquid crystal layer. That is, the thickness d may be selected so as to satisfy a relation of $\Delta n d = \lambda/2$ where $\Delta n$ is the birefringence which is induced in the direction parallel to the substrate plane when a predetermined voltage is applied across the pixel electrode and the common electrode to form an electric field in the liquid crystal layer, namely the anisotropy of refractive index, $\Delta$nd is a phase difference (retardation), and $\lambda$ is a wavelength of light. For example, for light having a wavelength of 550 nm, the thickness d may be selected so as to satisfy a relation of $\Delta$nd=275 [nm].

However, in an actual liquid crystal display panel, the in-plane electric field distribution is not uniform, and accordingly, the birefringence being induced is not uniform. Therefore, in order to realize brighter display, since the retardation $\Delta$nd of the liquid crystal layer 310 is slightly greater than $\lambda$/2, the thickness d may be appropriately selected within the range of 275 nm$\leq\Delta$nd$\leq$400 nm for light having a wavelength of 550 nm, for example.

Isotropic liquid crystals are materials that exhibit an anisotropy of refractive index depending on the intensity of the electric field applied to the liquid crystal layer, and the greater the intensity of the electric field, the larger is the anisotropy of refractive index. Although the relationship between the electric field intensity and the anisotropy of refractive index differs from material to material, the fact that the square of electric field intensity (E/V) is proportional to the anisotropy of refractive index $\Delta$n is disclosed, for example, in Hirotsugu Kikuchi, Advanced Materials, Vol. 17, P 96-98, 2005.

In addition, similarly to the example described above, in this example, the first and second polarizing layers 200 and 210 are O-type polarizing layers, and can be obtained by forming a protection layer formed from triacetylcellulose on both surfaces of a film which is provided with a polarizing function by adsorbing iodine to stretched polyvinyl alcohol.

A third polarizing layer 250 is formed between the first polarizing layer 200 and the first transparent substrate 110. The third polarizing layer 250 is an E-type polarizing layer. The third polarizing layer 250 can be realized, for example, by coating lyotropic liquid crystals formed from dichroic dye on the first polarizing layer or the first transparent substrate. Such lyotropic liquid crystals are disclosed, for example, in JP-T-2006-518871, JP-A-2006-285219, and Takashi Tamaoki, Journal of the Japanese Liquid Crystal Society, Vol. 11, No. 1, 2007, p 37-45. For example, when lyotropic liquid crystals formed from dichroic dye are used as the materials of the third polarizing layer, a coating machine capable of coating a film while applying stress to the film may be useful. For example, a slit die coater is capable of supplying a polarizing layer material in the solution state to a coating surface and stretching a film along the coating direction while applying shear stress to the material. By this process, dye molecules are oriented and fixed, whereby an E-type polarizing layer can be formed. In this case, the absorption axis of the polarizing layer is orthogonal to the coating direction.

In order to enhance orientation of dye molecules on the coating surface of the polarizing layer, a foundation treatment may be performed using an alignment layer or the like. As the alignment layer, polyimide-series polymers, diamond-like carbons, or the like can be used. When the alignment layer is polyimide-series polymer, it may be helpful to perform rubbing or irradiate polarized ultraviolet light so that an alignment regulating force is generated in a desired direction. Moreover, materials which exhibit dichroic properties upon being irradiated with linearly polarized light may be used as the polarizing layer.

In the present invention, the materials and processes of the third polarizing layer are not particularly limited. And in any method, it is desirable that the third polarizing layer 250 is an E-type polarizing layer of which the extinction coefficients satisfy the relation of $1.3 \geq kx/kz \geq 0.5$ if $kx/ky \geq 5$, and the relation of $kx/kz \leq 2.0$ if $kx/ky \geq 10$ as described in the above description. In addition, from the above-mentioned reasons, the third polarizing layer 250 is desirably an E-type polarizing layer in which the relation of $kx=kz>ky$ is satisfied.

In the liquid crystal display device shown in FIG. 26, the pixel electrode 190 and the common electrode 170 are bent in a V shape. The pixel electrode 190 and the common electrode 170 are tilted at an angle of $\alpha$=45° and $\beta$=135°, as shown in the figure, with respect to the extending direction (longitudinal direction) 7A of the data lines 7, and thus, the electrodes have a bent angle of 90°. In this case, in order to increase the aperture size, it is desirable that the data lines 7 are also bent at an angle of 90° similarly to the pixel electrode 190 and the common electrode 170. In this way, by bending the pixel electrode 190 and the common electrode 170 at an angle of 90°, the directions of the anisotropy of refractive index which is induced by an electric field formed in the liquid crystal layer upon application of a driving voltage will be at an angle of 90°. Therefore, coloring resulting from a difference in the azimuth angles will be averaged within one pixel, and the viewing angle property will be improved.

It should be noted that substantially the same effects can be obtained if a difference in the bent angles of the electrodes is within the range of ±2°.

In addition, in this example, as shown in FIG. 27, the direction of the absorption axis 250A of the third polarizing layer 250 is orthogonal to the extending direction 7A of the data lines 7.

Therefore, when the third polarizing layer 250 is realized by coating lyotropic liquid crystals formed from dichroic dye while applying shear stress to the first transparent substrate 110, it may be helpful to make the coating direction be parallel to the extending direction of the data lines, namely be parallel to the sides of the first transparent substrate 110. In this case, by coating the third polarizing layer materials, for example, using a slit die coater or the like, there is an advantage in that non-effective areas on the substrate where the polarizing layer materials are not easily coated can be reduced. Moreover, when the first transparent substrate 110 is cut from one large-size mother substrate, it is possible to reduce non-effective areas on the mother substrate where polarizing layer materials are not easily coated. Therefore, there is an advantage in that material costs can be reduced since more number of the first transparent substrates can be effectively obtained from one mother substrate.

Similarly to the above example described with reference to FIG. 24, the liquid crystal display device of this example is constructed by a liquid crystal display panel and a backlight disposed on the back surface thereof. In this configuration, the light that is emitted from the backlight and irradiated onto the liquid crystal display panel is incident on the third polarizing layer 250 after passing through the second polarizing layer 210 and the liquid crystal layer 310.

In this case, when a driving voltage corresponding to the image information transferred from an image information generation unit is applied to the pixel electrode 190, a potential difference is generated between the pixel electrode 190 and the common electrode 170, and an electric field is formed in the liquid crystal layer 310, whereby birefringence is induced. By this action, the polarization state of light passing through the liquid crystal layer 310 is changed, and the amount of light passing through the third and first polarizing layers 250 and 200 can be controlled.

For example, when the driving voltage is 0 V, namely when there is no potential difference between the pixel electrode 190 and the common electrode 170, and no electric field is formed in the liquid crystal layer 310, the polarization state of light passing through the liquid crystal layer 310 is not changed since the liquid crystal layer 310 is in an optically isotropic state. Therefore, most of the light passing through the liquid crystal layer 310 will be absorbed by the third and first polarizing layers 250 and 200, and will appear black (dark).

On the other hand, when a predetermined driving voltage is applied, and a predetermined electric field is formed between the pixel electrode 190 and the common electrode 170, birefringence will be induced in the liquid crystal layer 310, and the polarization state of light passing through the liquid crystal layer 310 is changed. Therefore, the light passing through the liquid crystal layer 310 will pass through the third and first polarizing layers 250 and 200 in accordance with a change in the polarization state thereof and will appear bright with a predetermined luminance. For example, by the birefringence induced in the liquid crystal layer 310, when a driving voltage is applied such that an effective phase difference Δnd in the direction parallel to the substrate plane becomes λ/2, the light passing through the liquid crystal layer 310 will be converted to light which contains many linearly polarized light components that are orthogonal to the absorption axes of the third and first polarizing layers 250 and 200. Moreover, most of the light will pass through the third and first polarizing layers 250 and 200 and will appear brightest with the maximum luminance.

In the liquid crystal display device of this example, since the third polarizing layer 250 is an E-type polarizing layer of which the extinction coefficients satisfy the above-mentioned requirements, and the liquid crystal layer 310 is optically isotropic during the black display, the polarization state of the light passing through the liquid crystal layer 310 will not be changed. Therefore, the light leakage in the oblique direction during the black display is reduced, a high contrast ratio is obtained. That is, a liquid crystal display device having a wide viewing angle can be realized.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device having a liquid crystal display panel comprising:
   a first substrate;
   a second substrate;
   a liquid crystal layer interposed between the first substrate and the second substrate;
   a pixel electrode and a common electrode formed on the second substrate so as to drive the liquid crystal layer;
   a first polarizing layer provided on the first substrate side of the liquid crystal layer;
   a second polarizing layer provided on the second substrate side of the liquid crystal layer, the absorption axes of the first and second polarizing layers being orthogonal to each other, and both the first and second polarizing layers being O-type polarizing layers; and
   a third polarizing layer which is either an E-type polarizing layer having an absorption axis parallel to an absorption axis of the first polarizing layer and disposed between the first polarizing layer and the liquid crystal layer or an E-type polarizing layer having an absorption axis parallel to an absorption axis of the second polarizing layer and disposed between the second polarizing layer and the liquid crystal layer, wherein liquid crystal molecules constituting the liquid crystal layer are oriented in parallel to at least a substrate plane of the first and second substrates, and a molecular long axis thereof is orthogonal to an absorption axis of the third polarizing layer, wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $1.3 \geqq kx/kz \geqq 0.5$ if $kx/ky \geqq 5$ and a relation of $kx/kz \leqq 2.0$ if $kx/ky \geqq 10$.

2. A liquid crystal display device having a liquid crystal display panel comprising:
   a first substrate;
   a second substrate;
   a liquid crystal layer interposed between the first substrate and the second substrate;
   a pixel electrode and a common electrode formed on the second substrate so as to drive the liquid crystal layer;
   a first polarizing layer provided on the first substrate side of the liquid crystal layer; and
   a second polarizing layer provided on the second substrate side of the liquid crystal layer, the absorption axes of the first and second polarizing layers being orthogonal to each other, and one of the first and second polarizing layers being an O-type polarizing layer, and the other being an E-type polarizing layer;

wherein liquid crystal molecules constituting the liquid crystal layer are oriented in parallel to at least a substrate plane of the first and second substrates, and a molecular long axis thereof is orthogonal to an absorption axis of a polarizing layer which is formed by the E-type polarizing layer among the first and second polarizing layers, wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $1.3 \geqq kx/kz \geqq 0.5$ if $kx/ky \geqq 5$ and a relation of $kx/kz \leqq 2.0$ if $kx/ky \geqq 10$.

3. A liquid crystal display device having a liquid crystal display panel comprising:
   a first substrate;
   a second substrate;
   a liquid crystal layer interposed between the first substrate and the second substrate;
   a pixel electrode and a common electrode formed on the second substrate so as to drive the liquid crystal layer;
   a first polarizing layer provided on the first substrate side of the liquid crystal layer;
   a second polarizing layer provided on the second substrate side of the liquid crystal layer, the absorption axes of the first and second polarizing layers being orthogonal to each other, and both the first and second polarizing layers being O-type polarizing layers; and
   a third polarizing layer which is either an E-type polarizing layer having an absorption axis parallel to an absorption axis of the first polarizing layer and disposed between the first polarizing layer and the liquid crystal layer or an E-type polarizing layer having an absorption axis parallel to an absorption axis of the second polarizing layer and disposed between the second polarizing layer and the liquid crystal layer, wherein the liquid crystal layer has a property such that an optically anisotropic state occurs from an optically isotropic state in response to voltage application, wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $1.3 \geqq kx/kz \geqq 0.5$ if $kx/ky \geqq 5$ and a relation of $kx/kz \leqq 2.0$ if $kx/ky \geqq 10$.

4. A liquid crystal display device having a liquid crystal display panel comprising:

a first substrate;

a second substrate;

a liquid crystal layer interposed between the first substrate and the second substrate;

a pixel electrode and a common electrode formed on the second substrate so as to drive the liquid crystal layer;

a first polarizing layer provided on the first substrate side of the liquid crystal layer; and a second polarizing layer provided on the second substrate side of the liquid crystal layer, the absorption axes of the first and second polarizing layers being orthogonal to each other, and one of the first and second polarizing layers being an O-type polarizing layer, and the other being an E-type polarizing layer, wherein the liquid crystal layer has a property such that an optically anisotropic state occurs from an optically isotropic state in response to voltage application, wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $1.3 \geqq kx/kz \geqq 0.5$ if $kx/ky \geqq 5$ and a relation of $kx/kz \leqq 2.0$ if $kx/ky \geqq 10$.

5. The liquid crystal display device according to claim 1, wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $kx=kz>ky$.

6. The liquid crystal display device according to claim 2, wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $kx=kz>ky$.

7. The liquid crystal display device according to claim 1, wherein the first polarizing layer is formed on a surface of the first substrate opposite to the surface close to the liquid crystal layer, wherein the second polarizing layer is formed on a surface of the second substrate opposite to the surface close to the liquid crystal layer, wherein the third polarizing layer is formed either between the first polarizing layer and the first substrate or between the second polarizing layer and the second substrate.

8. The liquid crystal display device according to claim 2, wherein the first polarizing layer is formed on a surface of the first substrate opposite to the surface close to the liquid crystal layer, and wherein the second polarizing layer is formed on a surface of the second substrate opposite to the surface close to the liquid crystal layer.

9. The liquid crystal display device according to claim 3, wherein an extinction coefficient kx in an absorption axis direction on the plane of the third polarizing layer, an extinction coefficient ky in an in-plane direction orthogonal to the absorption axis direction, and an extinction coefficient kz in a thickness direction satisfy a relation of $kx=kz>ky$.

10. The liquid crystal display device according to claim 4, wherein an extinction coefficient kx in an absorption axis direction on the plane of a polarizing layer which is the E-type polarizing layer among the first and second polarizing layers, an extinction coefficient ky in an in-plane direction orthogonal to the absorption axis direction, and an extinction coefficient kz in a thickness direction satisfy a relation of $kx=kz>ky$.

11. The liquid crystal display device according to claim 3, wherein the first polarizing layer is formed on a surface of the first substrate opposite to the surface close to the liquid crystal layer, wherein the second polarizing layer is formed on a surface of the second substrate opposite to the surface close to the liquid crystal layer, wherein the third polarizing layer is formed either between the first polarizing layer and the first substrate or between the second polarizing layer and the second substrate.

12. The liquid crystal display device according to claim 4, wherein the first polarizing layer is formed on a surface of the first substrate opposite to the surface close to the liquid crystal layer, and wherein the second polarizing layer is formed on a surface of the second substrate opposite to the surface close to the liquid crystal layer.

13. The liquid crystal display device according to claim 7, wherein the surface of the first substrate opposite to the surface close to the liquid crystal layer is an observer side.

14. The liquid crystal display device according to claim 11, wherein the surface of the first substrate opposite to the surface close to the liquid crystal layer is an observer side.

* * * * *